United States Patent
Cook

(10) Patent No.: US 11,636,413 B2
(45) Date of Patent: Apr. 25, 2023

(54) AUTONOMIC DISCRETE BUSINESS ACTIVITY MANAGEMENT METHOD

(71) Applicant: Daniel M. Cook, Woodside, CA (US)

(72) Inventor: Daniel M. Cook, Woodside, CA (US)

(73) Assignee: Daniel M. Cook, Woodside, CA (US)

( * ) Notice: Subject to any disclaimer, the term of this patent is extended or adjusted under 35 U.S.C. 154(b) by 0 days.

(21) Appl. No.: 17/542,351

(22) Filed: Dec. 3, 2021

(65) Prior Publication Data

US 2022/0309427 A1    Sep. 29, 2022

Related U.S. Application Data

(60) Continuation of application No. 17/096,389, filed on Nov. 12, 2020, now abandoned, which is a
(Continued)

(51) Int. Cl.
| | | |
|---|---|---|
| G06Q 10/06 | (2012.01) |
| G06Q 10/00 | (2012.01) |
| G06Q 30/02 | (2012.01) |
| G06Q 30/06 | (2012.01) |
| G06N 7/00  | (2006.01) |

(Continued)

(52) U.S. Cl.
CPC ....... G06Q 10/06313 (2013.01); G06N 7/005 (2013.01); G06Q 10/00 (2013.01); G06Q 10/0635 (2013.01); G06Q 30/0201 (2013.01); G06Q 30/0641 (2013.01)

(58) Field of Classification Search
None
See application file for complete search history.

(56) References Cited

U.S. PATENT DOCUMENTS

| | | |
|---|---|---|
| 5,930,830 A | 7/1999 | Mendelson et al. |
| 6,167,385 A | 12/2000 | Hartley-Urquhart |

(Continued)

FOREIGN PATENT DOCUMENTS

WO    WO-2006039401 A2 *   4/2006   ............. G06Q 10/06

OTHER PUBLICATIONS

Barnett, Michael W., and Charles J. Miller. "Analysis of the virtual enterprise using distributed supply chain modeling and simulation: an application of e-SCOR." 2000 winter simulation conference proceedings (Cat. No. 00CH37165). vol. 1. IEEE, 2000. (Year: 2000).*

(Continued)

*Primary Examiner* — Thomas L Mansfield

(57) ABSTRACT

An autonomic method for the comprehensive profiling of near or real time representations of time sequenced, synchronized, characterized business activity by any entity within a group of commercially related subscribing business partners, for the purpose of creating a near or real time universal business activity mosaic. An autonomic method within a group of commercially interrelated businesses to utilize a universal business activity mosaic to render a virtual customer storefront, whereby a business may discretely witness in time and character the sale of its own assets and services either fully or partially comprising those sold to anybody of related intermediate or end customers for the purpose of purchasing, selling, financing, warehousing or physically transporting assets on demand.

13 Claims, 18 Drawing Sheets

Related U.S. Application Data continuation of application No. 15/347,707, filed on Nov. 9, 2016, now Pat. No. 10,846,713, which is a division of application No. 10/875,467, filed on Jun. 23, 2004, now Pat. No. 9,495,652.

(60) Provisional application No. 60/480,927, filed on Jun. 23, 2003.

(51) Int. Cl.
*G06Q 10/0631* (2023.01)
*G06Q 10/0635* (2023.01)
*G06Q 30/0201* (2023.01)
*G06Q 30/0601* (2023.01)

(56) References Cited

U.S. PATENT DOCUMENTS

| | | |
|---|---|---|
| 6,457,040 B1 | 9/2002 | Mizuhara et al. |
| 6,493,712 B1 | 12/2002 | Karp et al. |
| 6,519,642 B1 | 2/2003 | Olsen et al. |
| 6,557,008 B1 | 4/2003 | Temple, III et al. |
| 6,560,608 B1 | 5/2003 | Tomm et al. |
| 6,662,237 B1 | 12/2003 | Leckie |
| 6,850,252 B1 | 2/2005 | Hoffberg |
| 7,039,701 B2 | 5/2006 | Wesley |
| 7,315,826 B1 | 1/2008 | Guheen et al. |
| 8,234,203 B1 | 7/2012 | Koretz |
| 8,538,740 B2 | 9/2013 | Kumar et al. |
| 9,898,706 B1 | 2/2018 | Cook |
| 2002/0046157 A1 | 4/2002 | Solomon |
| 2002/0138316 A1 | 9/2002 | Katz et al. |
| 2002/0143692 A1 | 10/2002 | Heimermann et al. |
| 2002/0152133 A1 | 10/2002 | King et al. |
| 2002/0174049 A1 | 11/2002 | Kitahara |
| 2002/0174103 A1 | 11/2002 | Hsiao et al. |
| 2003/0018616 A1 | 1/2003 | Wilbanks et al. |
| 2003/0023520 A1 | 1/2003 | Burk et al. |
| 2003/0041130 A1 | 2/2003 | Harrisville-Wolff et al. |
| 2004/0003369 A1 | 1/2004 | Gonos |
| 2004/0139184 A1 | 7/2004 | Bantz et al. |
| 2006/0111960 A1* | 5/2006 | Chess ............... G06Q 30/0201 705/7.29 |

OTHER PUBLICATIONS

"2014 Interim Guidance on Patent Subject Matter Eligibility", Federal Register, vol. 79, No. 241, pp. 74618-74633 (Dec. 16, 2014).

"Cloud computing," Wikipedia, Retrieved from Internet URL: http://web.archive.org/web/20190930080325/https://en.wikipedia.org/wiki/Cloud_computing, last edited on Sep. 27, 2019, pp. 22 (Jun. 8, 2022).

"Content delivery network," Wikipedia, Retrieved from Internet URL: http://web.archive.org/web/20201030153402/https://en.wikipedia.org/wiki/Content_delivery_network, last edited on Oct. 29, 2020, pp. 14 (Jun. 8, 2022).

Herbst, J., and Karagiannis, D., "Integrating Machine Learning and Workflow Management to Support Acquisition and Adaptation of Workflow Models", International Journal of Intelligent Systems in Accounting, Finance, and Management, vol. 9, Issue. 2, pp. 67-92, (Jun. 2000) (Abstract).

"World Wide Web Consortium," Wikipedia, Retrieved from Internet URL: http://web.archive.org/web/20201030041309/https://en.wikipedia.org/wiki/World_Wide_Web_Consortium, last edited on Oct. 29, 2020, pp. 7 (Jun. 8, 2022).

"WS-Management," Wikipedia, Retrieved from Internet URL: http://web.archive.org/web/20200106025412/https://en.wikipedia.org/wiki/WS-Management, last edited on Oct. 14, 2019, pp. 3 (Jun. 8, 2022).

Restriction Requirement in U.S. Appl. No. 10/875,467 dated Apr. 1, 2009, 16 pages.

Non-Final Office Action in U.S. Appl. No. 10/875,467 dated Aug. 21, 2009, 11 pages.

Final Office Action in U.S. Appl. No. 10/875,467 dated Jun. 8, 2010, 13 pages.

Non-Final Office Action in U.S. Appl. No. 10/875,467 dated Nov. 18, 2013, 24 pages.

Non-Final Office Action in U.S. Appl. No. 10/875,467 dated Sep. 5, 2014, 20 pages.

Final Office Action in U.S. Appl. No. 10/875,467 dated Jun. 18, 2015, 7 pages.

Notice of Allowance in U.S. Appl. No. 10/875,467 dated Jul. 6, 2016, 21 pages.

Non-Final Office Action in U.S. Appl. No. 15/347,707 dated Mar. 28, 2019, 15 pages.

Final Office Action in U.S. Appl. No. 15/347,707 dated Jan. 6, 2020, 19 pages.

Notice of Allowance in U.S. Appl. No. 15/347,707 dated Jul. 16, 2020, 7 pages.

* cited by examiner

Block Diagram of Apparatus Incorporated Within DBAM Engine or Functionally Equivalent Agent General Block Diagram of a Method for the Creation of a DBAM Engine Solution Buy on Demand : Virtual Storefront Schematic Application Administrator Portfolio Business Activity Management Discrete Business Activity Management Schematic

AUTONOMIC DISCRETE BUSINESS ACTIVITY MANAGEMENT METHOD

BACKGROUND

Field

The invention relates to the virtual operational management of discrete attributes between multiple commercial goods or service transacting entities for the purpose of significantly enhancing business operating performance. These entities may conduct business within, but are not limited to, any of the following vertical industry segments: Telecommunications and Network Infrastructure; Electronics; Aerospace; Automotive; Life Sciences; Distribution; Chemicals; Energy; Government; Food and Beverage.

The invention may also be embedded within new or enhanced products serving the above verticals by traditional providers of financial, manufacturing, insurance or other commercially contracted "outsourced" services.

Related Art

Though the division of labor following the outlaw of monopolistic practices in the 20th century has brought favorable competition and innovation, it has created one of the key limitations in the struggle to achieve even greater operating efficiencies across groups of interacting businesses. Specialization, even within traditionally "internal" business processes, continues to multiply the number of enterprise interfaces necessary to bring a single product to market, and with each interface, further splinters firewalled mission critical elements of business intelligence. As communication technology improves, this splintering trend will accelerate, along with the need to strategically, selectively and securely reassemble distributed intelligence to enhance or create new, more efficient business models, and fuel the next round of industrial productivity.

One technology embodiment enabling the invention is the "Grid" and its application to business solutions beyond its typical application as a networked or stand alone slave compute and storage facility. The Grid forms a basis for a significant differentiator in the future approach to interactive web-based services for commercial businesses. A product of the National Science Foundation's Middleware Initiative Grid Technologies define a core enabling paradigm for the invention. The evolution of the Grid, a product of the Internet and Grid Technologies, supports the application of Grid Technologies to business process, forming one embodiment of the foundation for the invention. Grid protocols, defined through the Open Grid Service Architecture (OGSA, the standards embodying the Grid, also represented by the Globus Standard) provide a standardized foundation to synchronously, securely and autonomously manage compute and storage resources regardless of their location, and entity ownership. These protocols bind to internet protocols which create the foundation of Grid Services. Collectively, these "services" enable enterprise or distributed applications which may be written to include standard services, "customized Grid services," or additional programming abstractions and are collectively managed by an administrative host.

A second enabling technology forming one embodiment of the invention is the release of the Globus Toolkit (3.0) which embodies the Grid standard. The emergence of Grid protocol standards have also partially eliminated what in the past was one of the greatest and most costly detractors of integrating systems—customizing software code to bridge dissimilar systems and architectures. By creating standard protocols, the Grid Forum has enabled hardware and software manufacturers to "Grid enable" their products. Now applications written to exploit Grid capabilities can be written incorporating standard or custom Grid services.

A third enabling technology for the invention is network security. Secure data transmission, intrusion detection, and encryption are required elements for the protection and distribution of sensitive information.

A fourth enabling factor for the invention is the emergence of the Basel Capital Accord II regulatory standards by the Federal Reserve and the G-8. The Basel Capital Accord II standards focus amongst other things on the discrete management of operating risk within the loan portfolios of regulated commercial banks. Because typical loan adjudication processes are lender specific, the Fed has few standards to apply to enforce uniform risk policy, and thus relies mostly on heuristic guidelines for conformance, such as those supplied by professional organizations such as Financial Accounting Standards Board (FASB), or the Commercial Finance Association (CFA). The invention has been partially disclosed to a member of the Federal Reserve System Task Force on Internal Credit Risk Models within the Federal Reserve Bank of Washington, D.C. and favorably received. The Fed is looking to industry to attempt to supply some finite number of acceptable solutions which they can specify. To incentive lenders to comply, the Fed has also proposed the lowering of reserves for banks that can demonstrate an acceptable operating risk management scheme before 2005.

A fifth enabling factor for the invention is the motivation on the part of lenders to find new ways of measuring, monitoring and developing competitive, loan products—safely. Discrete asset risk management enables direct asset conversion risk assignment to be calculated and applied to discrete asset purchases, previously impossible and impractical. Asset risk conversion has payment and performance risk implications within most banks lending formulas and allows quantification of risk and "cherry picking" (discerning lower risk for greater profit opportunity over competing lenders) for improvement in loan "classification" and thus in loan margins through sound analysis of their underlying risk. The invention adds a fourth loan classification beyond (1) company sector, (2) historical financials, (3) loan officer judgment, by which to determine credit worthiness. The invention also provides an extremely proactive and cost effective platform for active loan monitoring.

A sixth enabling factor for the invention is the industry-recognized need to find a solution that will support the outsourced solution of production procurement. The invention provides the three key service provider accountability elements which have prevented the paradigm from being adopted on a mass-scale: accountability to service provider "best price", stochastic delivery assurance, and comprehensive quality assurance alert and response.

A seventh enabling factor for the invention is the beginning of acceptance of the concept of autonomic computing and the proliferation of the Grid. This is simply that applications, deployed within in a Grid network, will begin to do the lower level repetitive tasks, formerly done by people. The invention may embody some elements of an intelligent rule base.

An eighth enabling factor for the invention is the trend in software acquisition to "rent" rather than purchase and own software (software as a service, or SAAS). A huge financial benefit resulting from the outsourcing of many company operations and services is that they may be accounted for on a variable cost basis. This scheme lowers a service customer's break even level, making them more apt to survive fluctuations in business. The invention is designed to viably function within a "rent by the bit, rent by time or rent by node environment" and can be also be incorporated within a service provider's fee base—to support a higher level on-demand value add service to an end customer.

A ninth and most general enabling factor for the invention is the extreme pressure placed upon companies to expand profit margins. This is accomplished by incurring successively lower costs of product for the same revenue dollar. The largest impacting (typically) source of cost within an organization is what it pays for purchased assets and services. These require constant attention to successfully manage with constantly fewer resources.

It is the object of the invention is to create a discrete business activity management (DBAM) engine service capability, spanning across partner business entities and to selectively and universally, reassemble critical business intelligence—lost through the division of labor—sanctioned by the DBAM engine subscribers on a scale impossible to humanly reproduce—to create the most cost effective and cost impacting mechanism for the instantaneous management of business attributes. Since purchased assets, services and discretionary expense, including payroll and capital, typically represent the largest component of a company's profits and losses, and have a significant impact on cash flow, it only makes sense that they should be managed with the highest level of business intelligence.

SUMMARY

An autonomic discrete business activity management method embodying a core engine which may be linked, with accompanying administrative controls, to applications which are primarily designed to explicitly yield favorable impact to a business' profits and losses or balance sheet, or offer new revenue services which may be resold to enterprise customers. At the core of the invention is the precept that since third party service providers have become largely responsible for their customer's operating performance, business intelligence must be integrated confidentially and transparently at the enterprise and service provider levels. Since the majority of this business intelligence resides within enterprise firewalls or is scattered amongst service partners and business happens in real time, a method of synchronously accessing and universally rendering prevailing business conditions is necessary to enable the basis for achieving previously unattainable gains in business productivity. Finally, the creation of this transparent, synchronized and universal business activity mosaic, viewable without data parallax by each participant, has the effect of creating new operating and services paradigms.

The DBAM engine and network user configuration provides the foundation for several operating and services innovations through the continuous management of attribute characteristics in the configuration, ownership, time and value domains. The fact that information can be logged in time enables a discrete, virtual snapshot of a company's business activities and creates the digital basis for higher level intelligence judgments which can be determined and executed in a semi or fully autonomic mode. The existence of the Grid, or a functional equivalent, along with accompanying administrative controls to link and manage specific applications, enables these manipulations to be ordered and conducted faster and more effectively than with its human or spreadsheet predecessor.

The four business applications residing above the DBAM engine, or a functionally equivalent agent, include, but are not limited to: Buy on Demand, Zero Cash Cycle, Portfolio Business Activity Management, and Bid to Market.

Each is intended to be "sold" to the subscribing customer on a monthly fee basis or on a volume of asset activity basis, or bundled within the service offering of a service provider of outsourced services. The DBAM engine may be linked to a subscriber's IT infrastructure for the purpose of gathering, confidentially creating the business mosaic, enabling semi or fully autonomic functions and reporting service provider performance. The invention service may be linked to a provider's IT infrastructure for the purpose of operating on the collective business mosaic data, selectively displaying the business mosaic, and reporting performance.

DETAILED DESCRIPTION

The following serves as a glossary of terms as used herein:

DBAM—Discrete Business Activity Management. "DBAM" may also represent the DBAM engine or may include DBAM applications if used in system context.

"An autonomic method utilizing controlled, secure compute resource accessibility, distributed computing applications, resource compute and storage assets for the comprehensive profiling of near or real time representations of time sequenced, synchronized, characterized business activity, at any elemental level, by any supplying or consuming entity within a group of commercially related subscribing business partners, for the purpose of creating a near or real time universal business activity mosaic.

Figure 16:
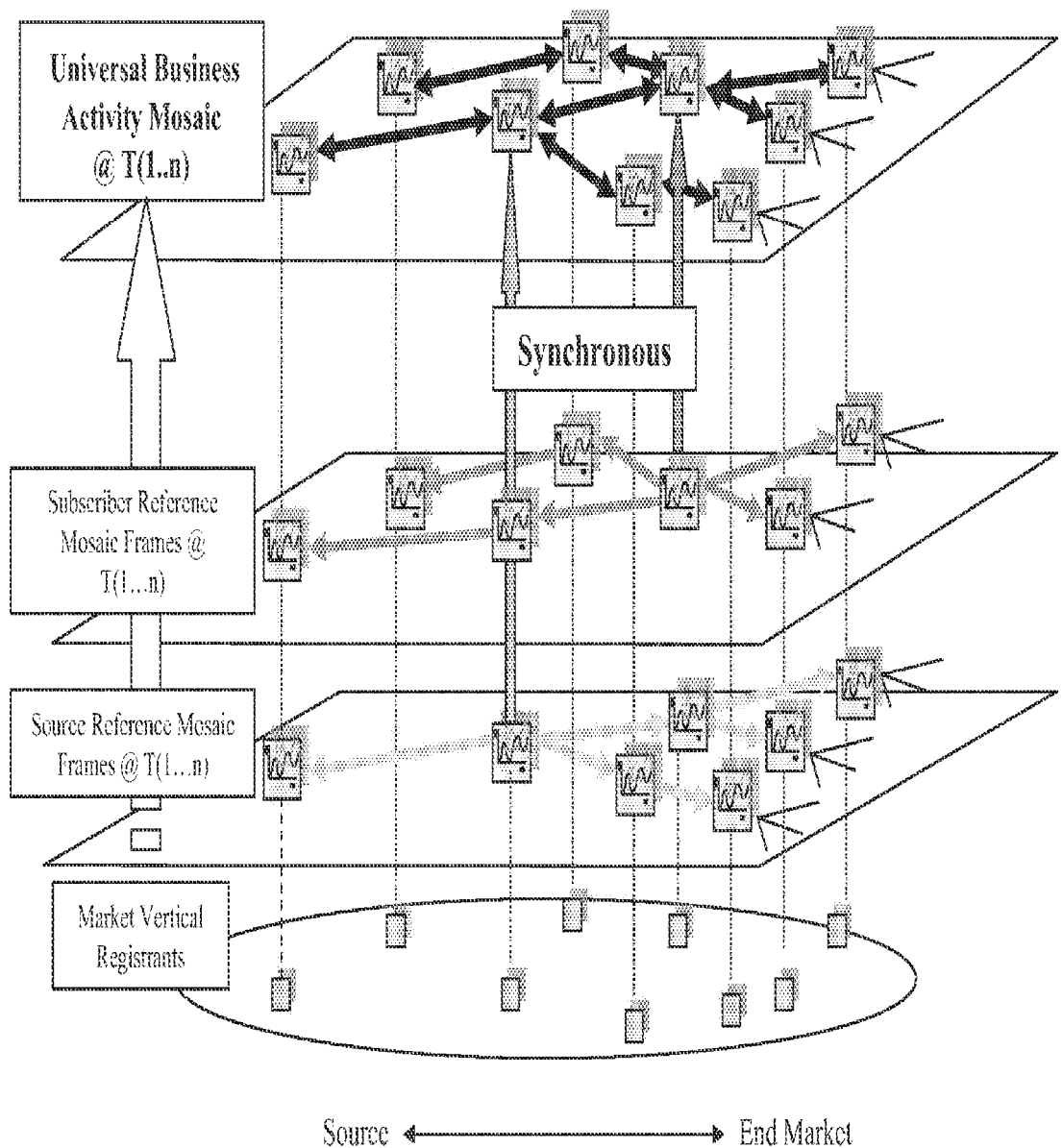
FIG. 16 illustrates a Universal Business Activity Mosaic, where the Mosaic is defined in Time from Synchronously Time Indexed Reference Mosaic Frames.

The mosaic, defined in time by synchronously indexed reference mosaic frames (see FIG. 16), provides quantified assessments of differentiated attribute states that are universally viewable from any entity reference point by virtue of a Grid framework which controls the synchronous extraction, conditioning, translating, filtering of proprietary content and routing of attributes between business partners. Proprietary content is safely distilled within privacy domains designated and at levels specified by subscribers to produce exportable data which may be assembled between business partners and processed to embed mission critical business intelligence within the mosaic. Interpretation of the intelligence within the mosaic results in significant time compression of market knowledge discovery by (attribute element) and by subscribing entity on the basis of near or real time event representation occurring at the end customer consumption point, or at any point in between."

BOD—Buy on demand.

BTM Bid to market.

0CC—Zero Cash Cycle.

PBAM—Portfolio business activity management.

Entity—Any commercial business engaged in the procurement or sale of tangible property or services. An entity can encompass a single node or a plurality of nodes. As used herein, "entity" may represent a single node or a plurality of nodes. Also used as "entities."

Subscriber—An entity electing to utilize DBAM. A "source" is also subscriber but when used with the word "subscriber" in explanatory text, the source is a supplier to the subscriber.

Asset—Physical asset or tangible service sold for revenue by a seller to a buyer.

Business Attribute—Describes any tangible asset or service purchased or re-sold by a commercial business, related expenses incurred as the result of such activities, or any other object of managed business activity that may be parametrically represented.

Business Attribute Parameters—Quantitative measures which are used to describe business attributes which may be time dependent or time independent defined as, but not limited to:

Time Dependent Extracted and Translated Business Asset Attribute Parameters:

Customer asset ownership relationship; Asset Sale to Customer Relationship; Quantity Assets Transacted (received, shipped, eliminated, returned) between partners and locations; Quantity Assets Held (by inventory location at subscriber level); Location Assets Held; Quantity Assets Expected (to be received) by partner supplier; Quantity Asset Sales Booked/Backlogged/Returned (by customer).

Time Independent Extracted Translated Business Asset Attribute Parameters (Logged in Time):

Part Number—a unique identifier or description method for an Asset or Service; Physical Specification; Asset Type Class; Current Vendor(s) by Part Number and splits; Approved vendor list by part number and source vendor part number; Approved vendor list by service; Processing Lead Time (physical or transport); Subscriber specified service level requirements; Relationship to top level part number or other assets within a Bill of Material; Autonomic Procurement Status (does not require value add steps for management e.g. C part); Autonomic Sale Status (bid authorization on exchange); Service Level election; Margin Level election; Value Deterioration Level election; Cost Recovery Thresholds; Development ROI Thresholds; Prevailing Market Source Selections for Competitive Cost; Reverse or Normal Exchange Elections by part number.

Time Independent Extracted Translated Business Expense Attribute Parameters (Logged in Time):

Accounts Payable balances (by subscriber); Accounts Receivable balances (by subscriber); Invoice Retirement Dates and Comparative Amounts (by subscriber); Asset Valuation (cost); Asset Sale Price; Expense and type per chart of accounts; DBAM Application Services Providers Billing Summaries; DBAM Application Services Providers Performance Summaries; DBAM System Billing Services Summaries; DBAM System Performance Summaries; Attribute complaint or defect.

Service Provider Service Attribute Parameters—Quantitative measures which are used to describe business attribute parameter performance levels which are managed on behalf of a business entity by third party service providers. Defined as, but not limited to: Asset Delivery Service Level Election; Credit Availability Threshold Election; Risk Level or Other Loan Product Related Covenants; Threshold Business Levels for On line Auction Engagement; Flat Commission Rates for On line Auctions; DBAM Host Application Services Summaries; DBAM Application Services Providers Performance Summaries; DBAM Billing Services Summaries; DBAM Performance Summaries.

Data Element Integrity—Comprises data accuracy which includes, but is not limited to, the reconciliation of data syntax errors, data semantic errors, data schema errors, and data content or manipulation errors, or extraction errors.

Attribute Maintenance Functions—Program subroutines which are responsible for polling compute or storage resources for changes in time independent business attribute parameters.

Characterized Business Attribute State—A business attribute state defined by a predetermined set of related parameters for that attribute, related to a specific entity, extracted in time.

Synchronized Characterized Attribute States—Attributes between partner entities that have the same or approximately the same parametric representations in time for a given attribute.

Time Index—A single point in time used to synchronize characterized attribute states. Time indices used to synchronize a mosaic frame between entities are generally identical. Optionally, the time indices may exhibit error or some time differential between them provided the synchronous integrity between attribute parameters is not materially violated.

Translate—The conversion of an attribute's parametric representations or characterizations from one domain's context to a second domain's context, whereby the context of the translated attribute(s) from the first domain equate or have consistent meaning with those of the second domain. Optionally translate may also provide for data element integrity.

Translated Attribute State—A characterized business attribute state, such as for an asset related to a specific entity, that includes additional parameters that have been translated, from within each successive commercial customer domain, that collectively describe the specific entity attribute across the entire mosaic, at the same time index. Translations may be accomplished through the use of ERP's, bills of materials, which explicitly link a specific entity attribute between entities.

Data Parallax—The incongruence between the two or more entities' translated attribute states for the same attribute if examined from or at different time indexes.

Indexed Reference Mosaic Frame—A complete, single time indexed representation of an entity's translated attribute states.

Entity Reference Mosaic—Means a complete representation of an entity's indexed reference frames concatenated from the earliest time index up to the latest or otherwise designated time index. Also referred to as "mosaic" or "business mosaic."

Universal Business Activity Mosaic—The combination of at least two time indexed entity reference mosaics, or for as many as there are partners with entity reference mosaics, to create a single consolidated representation of asset states from the earliest time index up to the latest or otherwise designated time index, where all time indexes for each composing entity reference mosaic have been synchronized.

Stochastic Modeling Techniques—Any reasonable or customary mathematical methodology which may be used in the generation of probabilistic or non-probabilistic representations of past, current or future attribute parameter values.

Conditioned—Operated on using mathematical models which may smooth, stochastically represent trends or characterize variability, or otherwise quantitatively represent data patterns.

Anticipated Attribute Consumption—Attribute consumption or incidence based on the translated activity of a specific attribute at an intermediate or end customer level.

Autonomic—Any data or logical operation performed fully by machine or in part by a machine and human (semi-autonomic). As used herein, autonomic also includes semi or partial autonomic operations. Also used herein as "autonomous" or "autonomously."

Autonomic Computing—A term trademarked by IBM which largely encompasses the concept of managing compute resources without human intervention.

Outsource Services—Entity operations formerly conducted or managed internal to the entity, displaced to or independently provided by a third party contractor.

Autonomic Agent—A collection of software pre-configured with the ability to make logical judgments given a series of inputs which may represent a given set of conditions specified by a user entity. Optionally, logical judgments may extend to pre-programmed transactional or communication steps which may precipitate subsequent logical or tangible consequence, such as a transaction or communication without human intervention, thereby acting as a substitute for human intelligence for specified series of tasks or duties.

Registration—A process by which an entity identifies aspects about itself, typically, but not necessarily by use of applicable user interface.

Access Permissions—Logical permissions given to hosts or service providing entities for the purpose of accessing infrastructure resources under the condition of managed confidentiality.

Incorporated State—The new state of an asset or service following its sale from one entity to a customer, though still distinguishable, embedded with subsequent value add activity.

Internal or Third Party Resources—Primary or alternate compute, storage or network resources owned or contracted by way of independent third party, including the DBAM service provider for use in DBAM or other application function.

Privacy Domain—A virtual location or physical set of resources specified by subscriber which is permitted to contain confidential information. The domain is only accessible to parties designated by the subscriber and only attributed parameters filtered according to DBAM registration may be transported outside of the domain. A subscriber may specify multiple embedded or non-embedded privacy domains. Domains may be constructed using, but not limited to, SAML. The domain maintains intrusion detection and logs all input/output content and users to provide subscriber with proprietary function assurance.

SAML—Security Assertion Markup Language.

Grid Technologies (Grid)—Compute and network resources which support the sharing and coordinated use of diverse resources in dynamic, virtual organizations, created from geographically distributed components operated by distinct organizations with differing policies, of virtual computing systems that are sufficiently integrated to deliver the desired quality of service.

Service Level Requirements—Any residual asset level expected to be held and the probability of delivery within a designated time frame following request notification for a given asset.

Autonomic commercial procurement schemes—Commercial procurement schemes which are executed by a intelligent system agent residing within a compute system.

Related Intermediate or End Customers—Groupings of customers characterized by sequential sell-buy relationships with respect to an originating asset or service purchased from a source, whereby each successive customers (intermediate customers) adds some element of value to the original configuration of assets (embeds asset or service) purchased until the assets are consumed and utilized by the last buyer or buyers (end customers).

Asset Transfer Behavior—The group of parameters which represent the physical state of an asset or service such as physical description, quantity, transaction description (backlog, backlog request or confirm date, booking, billing, return), location, composition, owner, etc in time to a prevailing business activity level.

Asset Conversion Risk Profile—A numeric representation over time quantifying the probability of an asset's liquidation at a certain value.

Concatenated Entity Asset Conversion Risk Profile—The numeric representation over time quantifying the probability of an asset's liquidation at a certain value based on the sale of its elements in total or in part of an end customer product, while taking into account the asset supply between the asset's entity owner and the end customer, and other risk determinants such as buyer purchase risk.

Portfolio Business Activity—Any and all business strategies, tactics, or operating practices necessary to bring products to market, sustain a market presence over their lifetimes, and provide installed base customer support.

Service Provider—A business partner that may provide an integral operation or service to a subscriber. A service provider may also subscribe independently to DBAM, PBAM, 0CC, BOD or BTM.

Original Design Manufacturing Service Providers—Companies who offer design, manufacturing, fulfillment or other operational business services to clients.

Value Engineering—The concept of re-engineering products for the purpose of incorporating lower cost material or manufacturing schemes to improve product margins.

Portfolio Margin Performance—Product, gross or operating margin performance of a designated product.

Element Cost Trends—Past, current and future committed cost levels for a source element of an asset, service or other attribute.

Competitive Cost Recovery—A translation of the value deterioration from the intermediate or end market asset or service into which a source entity's asset is incorporated to the source entity's asset itself which would be proportionally required to restore its relative competitiveness.

Source Asset Recovery Profiles—A numeric representation over time quantifying the differential between the existing cost level of the asset and the necessary cost of the asset to recover discounts applied in the sale of the asset in its own or combined configuration to the end customer.

Autonomic Asset Cost Recovery Prioritization and Solicitation—The evaluation of source asset recovery profiles by source, and by prevailing transaction volume to prioritize the pursuit of specific asset recovery amounts from their sources which have the greatest impact to margin performance. Solicitation means the electronic request for asset recovery action (cost reduction) from the asset source, accompanied by the end market discounting justifications.

Competitive Cost Recovery—A translation of the value deterioration from the intermediate or end market asset or service into which a source entity's asset is incorporated to the source entity's asset itself which would be proportionally required to restore its relative competitiveness.

Reverse-Auction Exchanges—Exchanges which function by proposing a buy price to find a seller.

Request for Quotation—The asset characterization parameter information distributed by a buyer and necessary for a seller to submit a binding offer for sale of that asset.

Approved Vendor List—A list of source vendors for a given asset approved by the purchaser of that asset.

Extracting—The acquisition or gathering of data associated with one or more attributes from a given systems domain in accordance with registration preferences and mosaic generation.

Errors—The quantified differential in the attribute parameter value or manipulated attribute parameter value with respect to an expected or targeted value.

Real time—Data updates to attribute parameters or processed attribute parameters at a regular frequency measurable in incremental or integral seconds, minutes, days or weeks, or alternatively means updates to time independent attribute parameters occurring anytime after the parameters values or characterization of the parameters change.

Combining—The process by which attribute parameters are incrementally updated through extraction, intermediation, conditioning through constraints with prior values from historical mosaic generation (transport, conditions, concatenation).

Intermediation—The process by which attribute parameters are compared to their registered states in context and in taxonomy for the purpose of assuring accurate and consistent meanings of an attribute's parameter semantics and schemas within successive business mosaics.

Manipulating—The mathematical or contextual conversion of a given business attribute and its characterizing parameters with respect to time or other business attributes.

Application—An embodiment of software designed to function in connection with the DBAM or DBAM equivalent and an autonomic or semi-autonomic agent, to manage a specified set of business attributes that collectively function to govern or enable the governance of a designated business process. Applications may be domain centric or distributed across multiple domains.

Domain—The complete realm of operation, including those contracted to third parties, within which a commercial entity conducts business that is under the administrative control of that entity and for which a set of entity business attributes are maintained. Multiple domains may exist within as single entity.

Node—A single point within an entity from which extractions are conducted. An entity or a domain may contain a single node or multiple nodes.

Access—The conditional admittance to a node, governed by registration preference for the purpose of extraction or receipt of parametric or other data.

Transport—The physical movement of data between any registered nodes within the business mosaic including those of a registered third party control and administrative structure.

Business decisions—Actions declared to otherwise maintain or change the course of business operations.

Service—The embodiment of a DBAM, a DBAM equivalent and applications, data content reconciliation, any form of networking and technical support to a subscribing entity for a fee, regardless of existing relationships with one or more subscribing entities.

Constraints—Any series of quantitative formulae or logical rules applied in the manipulation of attribute parameters for the purpose of extracting meaning.

Computer—Any device use to manipulate or translate data.

Probe—Includes the monitoring for administrative, contextual, taxonomic, and parametric data content accuracy errors to insure discrete DBAM engine, or functionally equivalent agent, solution operating reliability. Also used as "probing."

Processing—Includes, but is not limited to, probing.

Operations—All critical processes employed by an entity for the purpose of conducting commerce.

Virtual customer storefront—A logical vantage point created from the assembly of data from multiple domains, from which any entity may view by way of data manipulation, and physically manage its operations in near real time or real time regardless of their physical location.

FOB—Freight on board and is used in connection with terms of sale to identify the point at which possession shifts from a buyer to a seller.

FASB—Financial Accounting Standards Board, a professional organization with the charter to establish and improve standards of financial accounting and reporting for the guidance and education of the public, including issuers, auditors, and users of financial information.

i2—A publicly traded US company specializing in the sale of enterprise supply chain software.

Moody's—A publicly traded US company specializing in corporate finance, banking, managed funds and risk management.

ODM—Original Design Manufacturing, a term used to describe a third party provider of design and manufacturing services.

Routing—The transport of data, in accordance with preferences, between domains and is necessary for the rendering of individual and successive mosaic frames. Also used as "route."

Preferences—The subscriber specified applications, configurations, access privileges, privacy domains, mosaic generation frequency, partner relationships and other considerations necessary for solution operation.

Conditioning—The mathematical manipulation of attribute parameters.

Synchronization—The process by which extractions from multiple domains are coincidentally represented in time for related business events using a Mosaic Time Index.

Translation Tables—The active, current, and historical representations of attributes and their representative time dependent and time independent parameters, along with their assigned interrelationships between domains and between entities, updated based on polling for changes in parametric representations or the based on the generation of successive business mosaics.

Taxonomy—Data schema or data format which a time dependent or time independent parametric data are represented for the purpose of storage, transport or computing interpretation.

Context—Data semantic or the specific meaning of parametric data with respect to the attribute and entity to which it is associated.

Enterprise—A commercial business entity, including any third party service provider.

QoS—Quality of service. Refers to the priority of one subscriber's user privileges over another, or the priority of one operation over another in the operation of the solution.

Subscribe—The act of choosing to purchase a solution on a commercial basis in which the choosing entity agrees to pay a pro-rated fee and adhere to specific terms in connection with the use of the solution. Also used as "subscribing".

Administrator—The embodiment of tasks required to manage the operation of the solution. Also used as "administrating."

Solution—The collective DBAM, DBAM engine administrator, and applications, as a non-service, or as a commercialized fee for service to subscribing entities.

Format—The configuration of the service including any combination of on-line software, networking, intermediation and content reconciliation to an entity.

Filtering—The removal of either unwanted data content from an original extraction or proprietary content restricted by subscriber registration for distribution beyond the point of extraction or beyond the registered privacy domain.

Reference—The point of view of any single subscriber.

Figure 1:
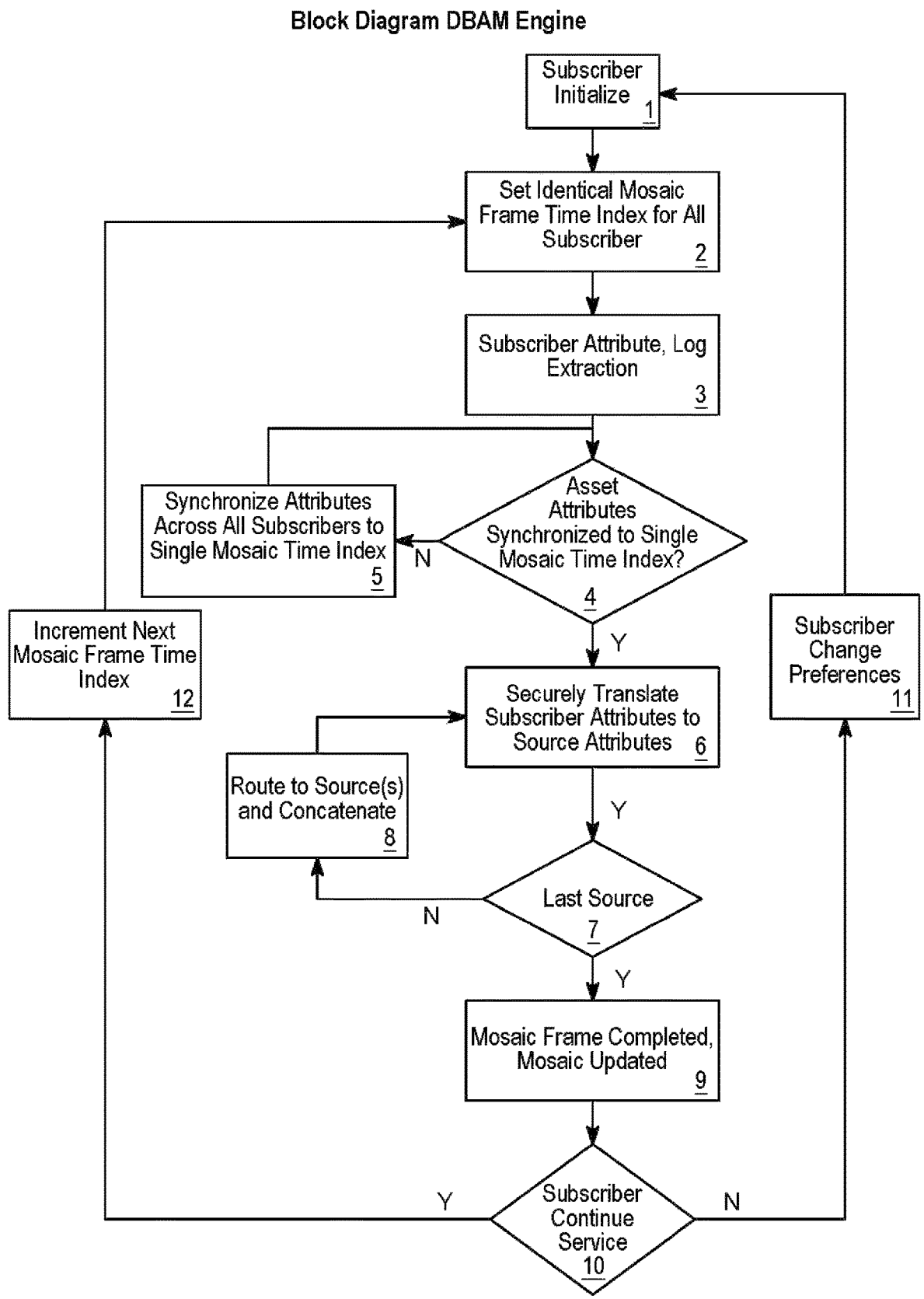
FIG. 1 is a general block diagram of preferred embodiment of how a DBAM engine operates.

FIG. 1 is a general block diagram of preferred embodiment of how autonomic discrete business activity management engine (DBAM) operates for controlled and/or secure compute resource accessibility and/or distributed computing applications and/or resource compute and/or storage assets for the comprehensive profiling of near or real time representations of time sequenced and/or synchronized and/or characterized business activity, at any elemental level, by any supplying and/or consuming entity within a group of commercially related business partners, for the purpose of creating a near and/or real time universal business mosaic. The business mosaic, defined in time by entity reference mosaics provides quantified assessments of time differentiated business attribute parameters that are viewable across the universal business activity mosaic from any specific entity reference point without data parallax.

Distilled views of specific business attributes within mosaics such as production assets, services or product margins may be generated for use with higher level coupled applications.

Figure 17:
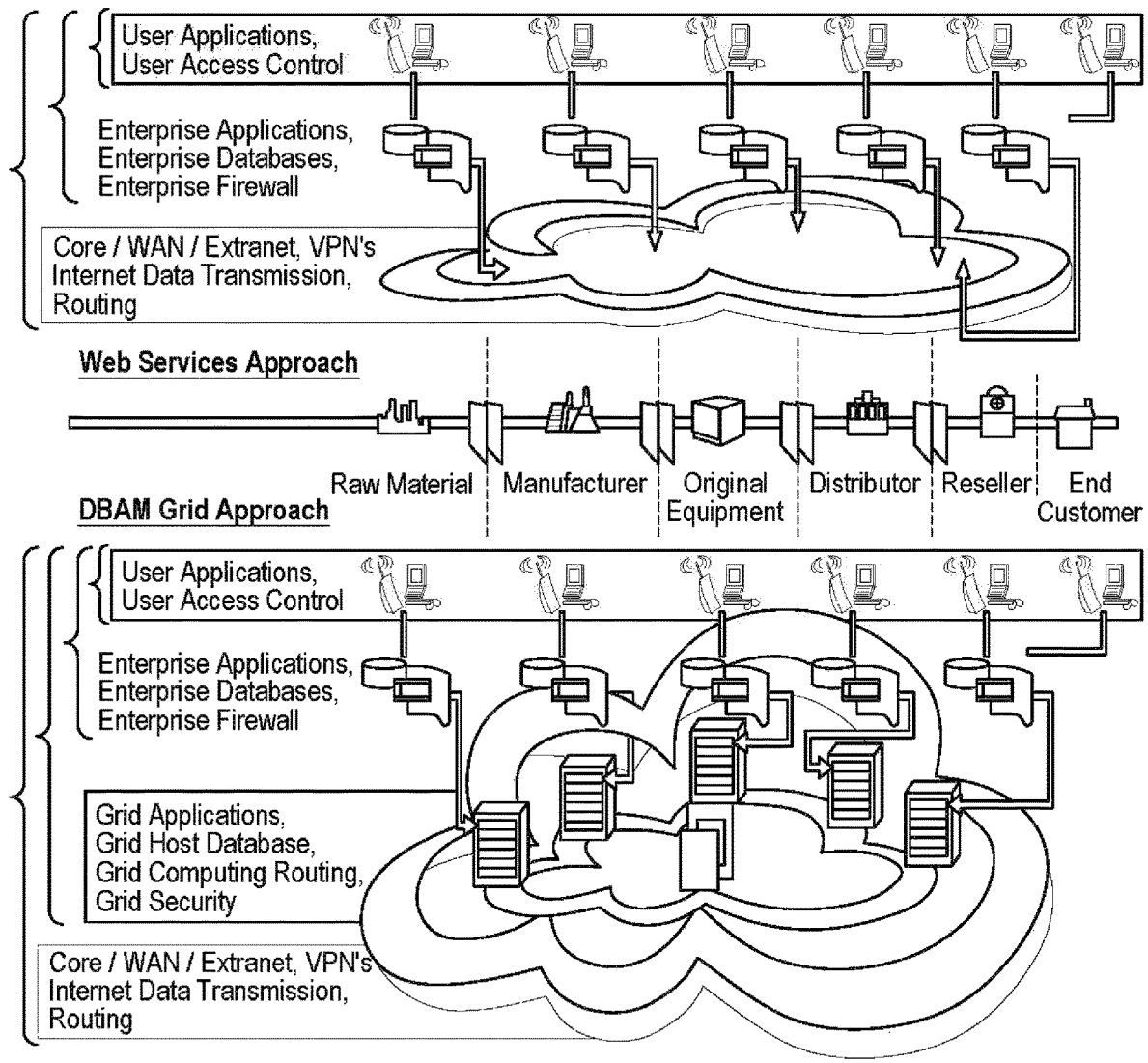
FIG. 17 is a preferred embodiment of the Discrete Business Activity Management (DBAM) architecture that uses a Grid Framework over conventional web services approach.

The Grid Framework is illustrated in FIG. 17. FIG. 17 is a preferred embodiment of the Discrete Business Activity Management (DBAM) that uses a Grid Framework over conventional web services approach. As per FIG. 17, the DBAM Grid Approach utilizes a Grid Framework that supports Grid Applications, Grid Host Databases, Grid Computing, Routing and Grid Security, all in connection with mobile and desktop compute devices, user applications and user access control; enterprise hardware, applications, databases and firewalls; internet, extranet and intranet hardware data transmission. Collectively, these elements are not supported in a Web Services Approach.

A Grid framework, or equivalent methodology deployed across participating commercial entities' IT infrastructure controls the synchronous extraction, conditioning, translating, filtering of proprietary content, and routing of business attribute parameters. The data that composes the entity reference mosaic is composed on the basis that proprietary data is not unknowingly shared between related business entities or their service providers and therefore is a function of pre-agreed scope of content exchange between entities, administered by the DBAM administrator and reflected by way of subscribing entity preference in the set up of the DBAM engine. The data may physically reside either inside or outside each entity's firewall in designated privacy domains operated by the DBAM engine administrator, depending on entity preference or the security attributes of the IT infrastructure framework, and if managed within these privacy domains, encrypted and monitored for intrusion.

Figure 18:
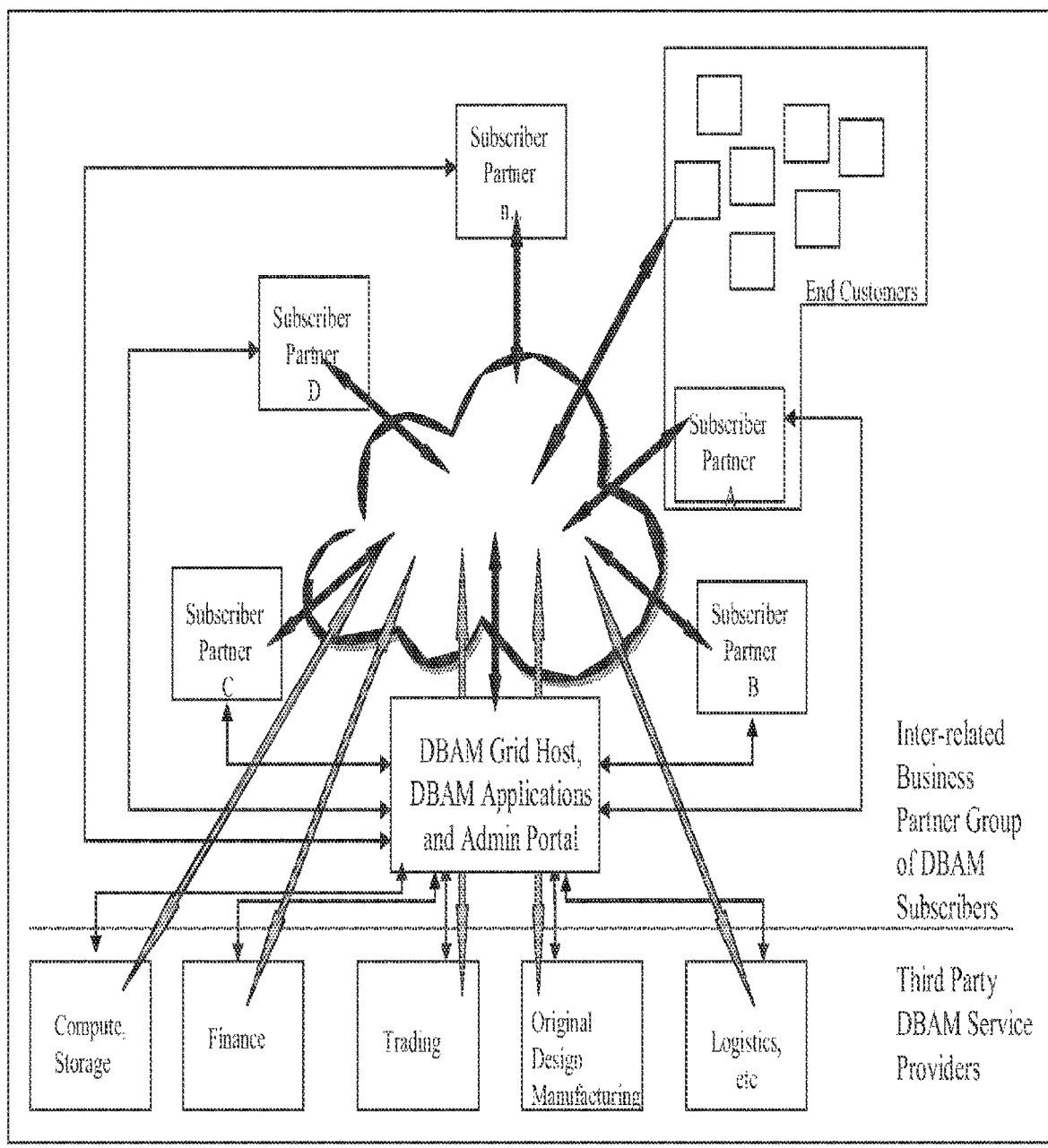
FIG. 18 illustrates a Discrete Business Activity Management Network in a Grid Framework for a Typical User Configuration.

FIG. 18 illustrates a Discrete Business Activity Management Network in a Grid Framework for a Typical User Configuration. The DBAM Grid service and network user configuration (see FIG. 18) provides the foundation for several operating and services innovations through the continuous management of attribute characteristics in the configuration, ownership, time and value domains. The fact that information can be logged in time enables a discrete, virtual snapshot of a company's business activities and creates the digital basis for higher level intelligence judgments which can be determined and executed in a semi or fully autonomic mode. The existence of the Grid enables these manipulations to be ordered and conducted faster and more effectively than with its human or spreadsheet predecessor.

Interpretation of the universal business mosaic through coupled applications with unique user interfaces to which each entity constituting a "subscriber", provides a novel method to time compress and communicate the formulation of business intelligence based on near or real time universal business activity discovery. Interpretation of a business mosaic through the same means provides a novel method of providing universal parallax free business activity perspective by virtue of the mosaic's comprehensive and synchronous entity construction. Both interpretative methods provide the foundation for such applications to manage basic business functions which can be executed on a semi or fully autonomic basis.

Instant advantages of the DBAM engine include, but are not limited to: (i) Unlike commercial supply chain "optimization solutions" which are applicable in the entity domain and with business partners from the perspective of the entity, the invention coincidentally and concurrently overlays all entity optimization solutions as if all entities were synchronously identified in one single asset mosaic domain regardless of the entity perspective; (ii) The business mosaic exposes significant operating efficiencies that exist between entities by eliminating or virtually eliminating data parallax; (iii) The ability to maintain the mosaic in the time domain provides a foundation for new group of business productivity and management applications to harvest exposed operating inefficiencies, or support new service paradigms to do same.

The following description of the steps is not in the order that they must occur.

Initially, the DBAM engine may require a logical registration and/or initialization 1. Registration and/or initialization 1 may request, either by human or computer, any combination, but is not limited by: entity and/or services registration; business partner registration; resource and/or access permissions registration; attribute registration.

Entity and/or services registration includes, but is not limited to, the process by which a subscribing entity physically and/or logically identifies itself with the DBAM engine. This process can be supported through user interfaces and/or extraction scripts. This process comprises entity identification, addressing, and/or election of services which are used to invoke deployment of the DBAM Engine or resulting DBAM applications.

Business partner registration includes, but is not limited to, registration of all or some business partners. This may be used to facilitate attribute data routing. This process may produce a partial or complete operational business partners map which may be used to enable subscriber reference business mosaics and/or announce subscriber business partners to each other.

Resource and/or access permissions registration includes, but is not limited to registration within a subscribing enterprise's own and/or via third party compute resource, storage or network service providers, or other network and/or information processing resources which may support attribute parameter routing, the assignment of access permissions, location of thin clients, and the administration of the DBAM engine. Access permissions registration, which may be determined by the subscribing entity, includes, but is not limited to the registration of access permissions for the DBAM engine, applications and/or service providers with respect to the registered resources, and the registration of privacy domains, or virtual zones beyond which proprietary attribute parameter information may not be transported prior to proprietary filtering.

Attribute registration may also include, but is not limited to attribute maintenance, and attribute mapping. Attribute registration comprises the selection of attributes to be included within the business mosaic, using the subscriber's own identifying taxonomy. Additionally, attribute registration may include confirmation of business attribute parameters and/or resource location, which may contain parametric data. Additionally, attribute registration may include translation tables required to convert attribute taxonomies between partners for use in routing asset parameters during the construction of mosaics or for the function of higher level interpretive applications. Additionally, attribute registration may include privacy domains beyond which attributes may not be distributed. Additionally, attribute registration may include attributes which may be encrypted and transported beyond a privacy domain in such a format which may preclude a third party observer of such data to fully reconstruct the respective attribute's characterized state.

The DBAM engine utilizes data extracted from different entities and projects them to a certain time index to achieve synchronization 5. Synchronization 5 allows for a subscribing entity's attribute parametric data extraction to be adjusted for time changing events for each occurring between the time index and the actual extraction time. Upon completion, the process may establish a time synchronous asset representation of the all or some business partners with data parallax effects eliminated. This synchronized data can be used to support higher level DBAM engine autonomic applications. Synchronization 5 may be conducted behind or outside the subscribing entity's firewall.

The time index 2 may be determined by a counter which identifies the specific point in time that each business mosaic frame and attendant subscriber attributes are referenced for extraction and synchronization. The DBAM engine may generate a time index and/or time index sequences, which may be governed by the DBAM engine itself. The time index is identical, or nearly identical for all business partners registered within the business mosaic and is ideally, although not necessarily sequenced at a constant interval with respect to prior frames. Further, the time index may be assigned to all extraction operations for data synchronization purposes. Data extractions may be normalized to the time index prior to further manipulation.

Synchronization 5 may also be used for, but is not limited to, combining the data into a business mosaic. For example, one may create a business mosaic by any combination, but not limited to, the following steps: initial data concatenation, data integration, data conditioning, and synchronization 5.

Initial data concatenation may comprise utilizing parametric data elements for a given attribute to initially concatenate a part number per subscribing entity versus all other parameters bases with prior extractions in time for a given attribute of a subscriber. Using optimal, conventional best-fit mathematical algorithms, an updated profile for each parameter is produced to characterize, quantify and preserve discrete customer behavior. This operation may be conducted behind or outside the subscriber firewall. This data operation may constitute and intermediate step if there are multiple system data sources within a single enterprise, and may necessitate a final consolidation operation (within a single entity) to enable a comprehensive overall part number/customer representation.

Data integration may comprise utilizing attribute profiles for integrating over all discrete customers within a single part number domain for a subscriber based on the extraction time index. Using conventional best-fit mathematical algorithms, an updated profile for each integrated parameter is produced to end customer behavior through the "single" part number. This operation may be conducted behind or outside the subscriber firewall.

Data conditioning may comprise conditioning each parameter profile using a advanced mathematical modeling techniques to provide stochastic representations of future business activity. Each forward projection range is bound in the context of graduated probabilities from zero to one hundred percent, and preserves collective market behavior.

Synchronization 5 of subscribing entities' attributes with the time index may occur in parallel or sequentially for all related business partners. Optionally, other concatenation, integration or conditioning permutations may be employed to complete synchronization, provided the permutations fully preserve the quantification of customer behavior for each attribute parameter.

Synchronization 5 may also allow, but is not limited to, allowing the subscribing entity to determine preferences, through a functionally equivalent registration and/or initialization step 1.

Synchronization 5 may allow, but is not limited to, determining when to extract the data from the subscribing entities 3. For example, the data may be attribute parameters, either time dependent or logged, from subscribing entity's resources that fully represents the attribute state of the subscribing entity. The DBAM Engine may process the complete set of descriptive attribute parameters which characterize the asset in relation to time and each other subscribing entity. Data extractions may be conducted at time intervals based on infrastructure resource availability and include changes in time independent asset attributes such as value and/or configuration which may be used to create parameter event logs (logs). Logs are written to and/or updated from the subscribing entity's internal compute resources at different times as changes occur in time independent asset attributes. These logs may be polled as part of each extraction operation. Extractions may be indexed according to the subscribing entities. This may permit data to be overlaid and used to create reference asset business mosaics for each partner within a business group. If extractions are unsuccessful, data may be substituted based on an approximation using prior and corrected with the next successful extraction. Each asset extraction may be, but is not necessarily, logged with the DBAM engine and may be stored either behind or outside the sub scriber firewall.

Additionally, the DBAM engine preferably will check to see that all subscribing entities have been synchronized 4.

After synchronization 5, the DBAM engine may translate data into each entity's format. Additionally, the DBAM engine may combine each translated data. Translation 6 may utilize a process by which attribute characterizations are quantitatively and/or synchronously related between subscribing entities. This may be prepared for confidential export.

For example, one may conduct translation 6 by, but not limited to, the following steps: source translation, data integration, data conditioning, and proprietary filtering.

The following preferred embodiment of source translation may be utilized for, but not limited to, preparing the attribute parameter profiles for distribution to business partners. Each attribute parameter profile may be cast within the context of the source part number. This may be accomplished by either exploding the original subscribing entity's part number into its sourced components, or, if no value add operations are conducted to the attribute; may be cast by cross referencing the subscribing entity's part number to the source part number. In the former case, the original part number may be exploded into its sourced elemental components based on current-effective bills of materials obtained within the attribute extraction. Following explosion, the source component part numbers assume the same synchronized time index, are overlaid with the same market characterized parameter profiles from their "reports to" part number or subscriber part number which represents the assembly to into which the source element part is embedded, but assigned component descriptions and values. This operation may be conducted behind or outside the subscriber firewall.

The following preferred embodiment of data integration may be utilized for, but not limited to integrating the attribute profiles for common sourced elemental attributes parameters within a single profile for each parameter. Using conventional best fit mathematical algorithms, an updated profile for each integrated parameter is produced to preserve end market behavior represented within all "reports to" part numbers. This operation may be conducted behind or outside the subscriber firewall.

The following preferred embodiment of data conditioning may be utilized for, but not limited to, conditioning the parameter profiles using a advanced mathematical modeling techniques to provide stochastic representations of future expected parameter values. Each forward projection range is bound in the context of graduated probabilities, and/or preserves recent and/or collective subscriber parameter behavior. This operation may be conducted behind or outside the sub scriber firewall.

The following preferred embodiment of propriety filtering may be utilized for, but is not limited to, preparing each source attribute parameter profile for exportation and/or routing from proprietary domains to source partners. Each profile may be filtered to remove confidential information as specified within the subscriber attribute registration or a process functionally equivalent to 1. This information includes but is not limited to related sales pricing and/or end customer. This operation may be conducted behind or outside the subscriber firewall.

Secure translation 6 of subscribing entities' data and/or attributes to source attributes with the time index may occur in parallel or sequentially for all related business partners. Optionally, other integration or conditioning permutations may be employed to complete data preparation for filtering, provided the permutations fully preserve the quantification of "reports to" part number behavior for each attribute parameter.

Additionally, the DBAM engine may check to see whether all translated data is combined 7, 8. This might occur by going from translating data from one subscribing entity and combining that data to another subscribing entity's translated data.

Additionally, the DBAM engine may route the business mosaic 9. Routing may be broadly construed to include, but is not limited to, the process by which translated subscribing entity's attribute states are routed to a mapped business partner source and concatenated with source attribute extractions within same time index frame. For example, a preferred embodiment, but not the only embodiment, may include, but is not limited to, the steps of: data integration, data conditioning, and concatenation of attribute parameter.

For example, the following preferred embodiment of data integration may include, but is not limited to, integrating common source attribute parameter profiles received from different customer subscribers into a single parameter domain. Further, utilization of conventional best-fit mathematical algorithms may be used to produce updates on profiles for each integrated attribute parameter. This operation may be conducted behind or outside the subscriber firewall.

For example, the following preferred embodiment of data conditioning may include, but is not limited to, conditioning the parameter profiles using a advanced mathematical modeling techniques to provide stochastic representations of future business activity. Each forward projection range is bound in the context of graduated probabilities, and/or preserves recent and/or collective subscriber parameter behavior. This operation may be conducted behind or outside the sub scriber firewall.

For example, the concatenation of attribute parameter may include, but is not limited to, the process of utilizing conditioned attribute parameter profiles originating from subscribers, or originating from downstream intermediate or end source-subscribers concatenated with source attribute parameter extractions from the same time index and like parameters assigned distinct values depending upon the origination of the translated parametric behavior. This operation may be conducted behind or outside the subscriber firewall.

Additionally, the routing 9 may occur sequentially for all related business partners beginning with end market partners, ending with the last source and indexing tier by tier as all subscriber-source mapped transfers and routings are complete within each tier. Optionally, other integration or conditioning permutations may be employed to complete data preparation for filtering, provided the permutations fully preserve the quantitative representation of subscriber translated behavior for each attribute parameter.

Additionally, the routing 9 of the business mosaic may reach completion, but is not limited to, upon reaching the final source and/or completing all synchronizing, integration, conditioning, translating, routing and/or concatenating tasks for a given time index for each entity reference business mosaic. Upon reaching completion, the DBAM engine may or may not place an entity reference mosaic to the business mosaic.

Additionally, the DBAM engine may inquire whether the subscribing entity has requested continued service 10. The subscribing entity may request continuation of the DBAM engine service without any actual confirmation. If the subscribing entity requests for a change 11 in registration and/or initialization 1 or functionally equivalent, then it is sent back to 1. If the subscribing entity does request continuation of service 12, then the entity is sent back to 2 for further iteration or iterations of the DBAM engine.

Figure 2:
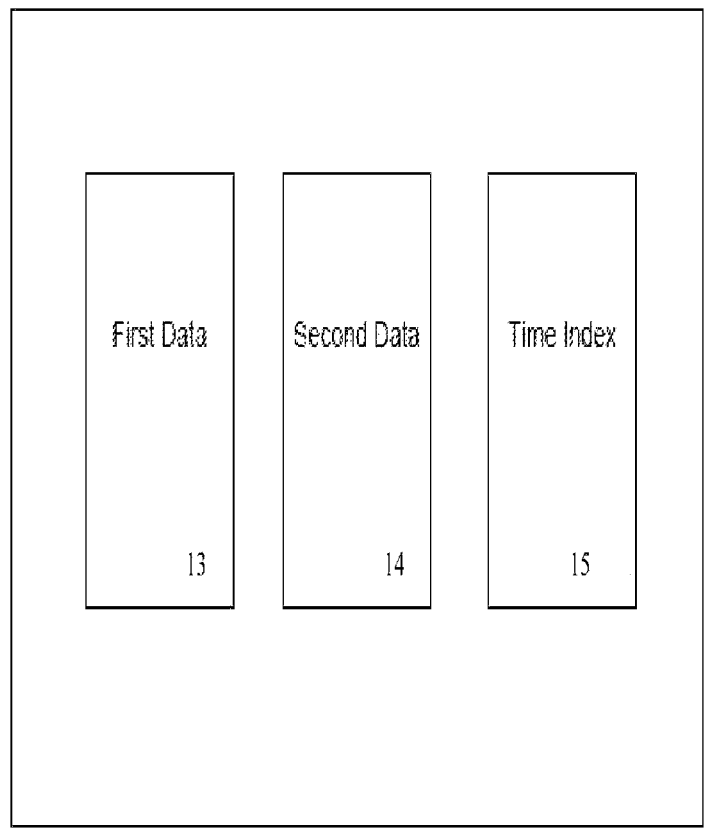
FIG. 2 is a general block diagram of an apparatus which may be incorporated within a DBAM engine or a functionally equivalent agent.

FIG. 2 is a general block diagram of an apparatus or data structure which may be incorporated within a DBAM engine or a functionally equivalent agent. The data structure comprises two data values 10, 11 and a time index value 12.

The two data values 10, 11 may comprise data extracted from two different entities. Alternatively, the two data values 10, 11 may comprise data that may have been generated utilizing synchronize 5 from FIG. 1 or a functionally equivalent process and/or the time index value 12. Alternatively, the two data values 10, 11 may comprise data that has been generated utilizing translation 6 from FIG. 1 or a functionally equivalent process.

Figure 3:
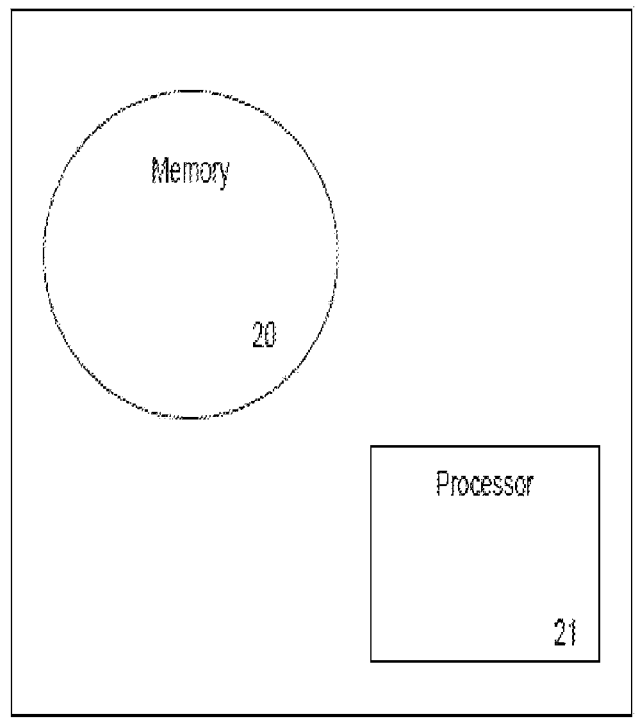
FIG. 3 is a general diagram of an apparatus which may be able to perform the functions of the DBAM engine.

FIG. 3 is a general diagram of an apparatus which may be able to perform the functions of the DBAM engine. The apparatus comprises a memory element 20 and a processor 21.

The memory element 20 may comprise data from one or more entities. The data may have a time element that may be read from the processor 21.

The processor 21 generates projections of the data and/or a process functionally equivalent to synchronize 5 of FIG. 1. The processor 21 may have the capability of processing the data for errors. As used herein, term "examining" pertains to the ability to view and/or review said data. The processor 21 may have the ability to translate the data into a format of one entity and/or a process of translation 6 of FIG. 1. The processor may also have the ability to transfer the data outside the apparatus by, but not limited to, a wired network or a wireless network.

Figure 4:
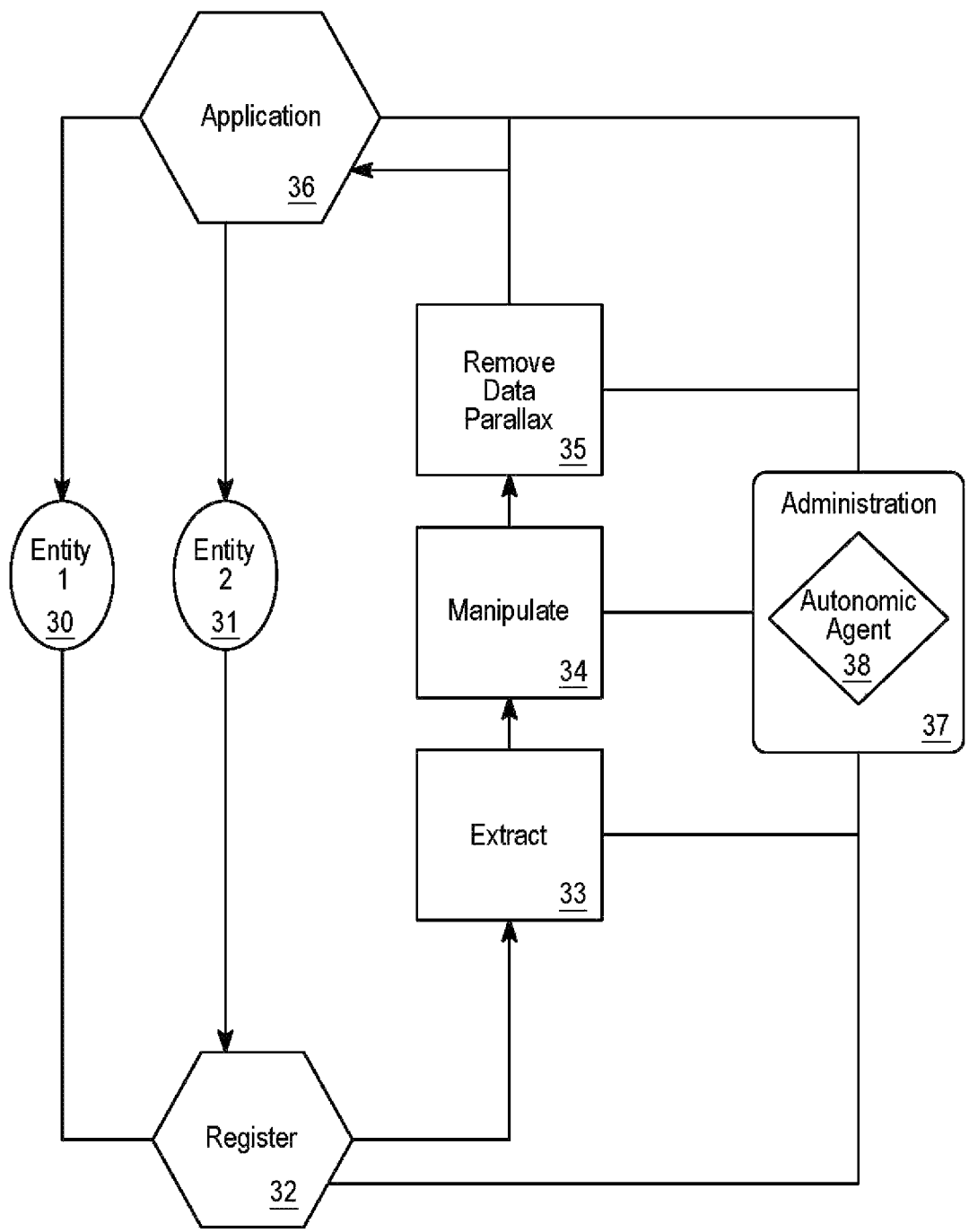
FIG. 4 is a general block diagram of a method for the creation of a DBAM engine solution.

FIG. 4 is a general block diagram of a method for the creation of a DBAM engine solution. The diagram displays how one or more entities 30, 31 may utilize a DBAM engine solution. The solution comprises the steps of, but is not limited to: registration 32 to an application 36 or a process functionally equivalent to registration and/or initialization 1 of FIG. 1; extraction 33 of data from an entity or a process functionally equivalent 3 of FIG. 1; manipulating 34 the data or a process functionally equivalent to synchronization 5 of FIG. 1; and removal of data parallax 35 from the data or a process functionally equivalent to translation 6 of FIG. 1.

In addition, the solution may comprise an administrator 37, which can be human or computer that will probe each step for the creation of a solution. Optionally, the administrator may contain an autonomic agent 38 which allows the steps to be conducted autonomously, or semi-autonomously.

Optionally, the solution created may be utilized by an application 36. The application may also be subject to probing by the administrator 37.

Figure 5:
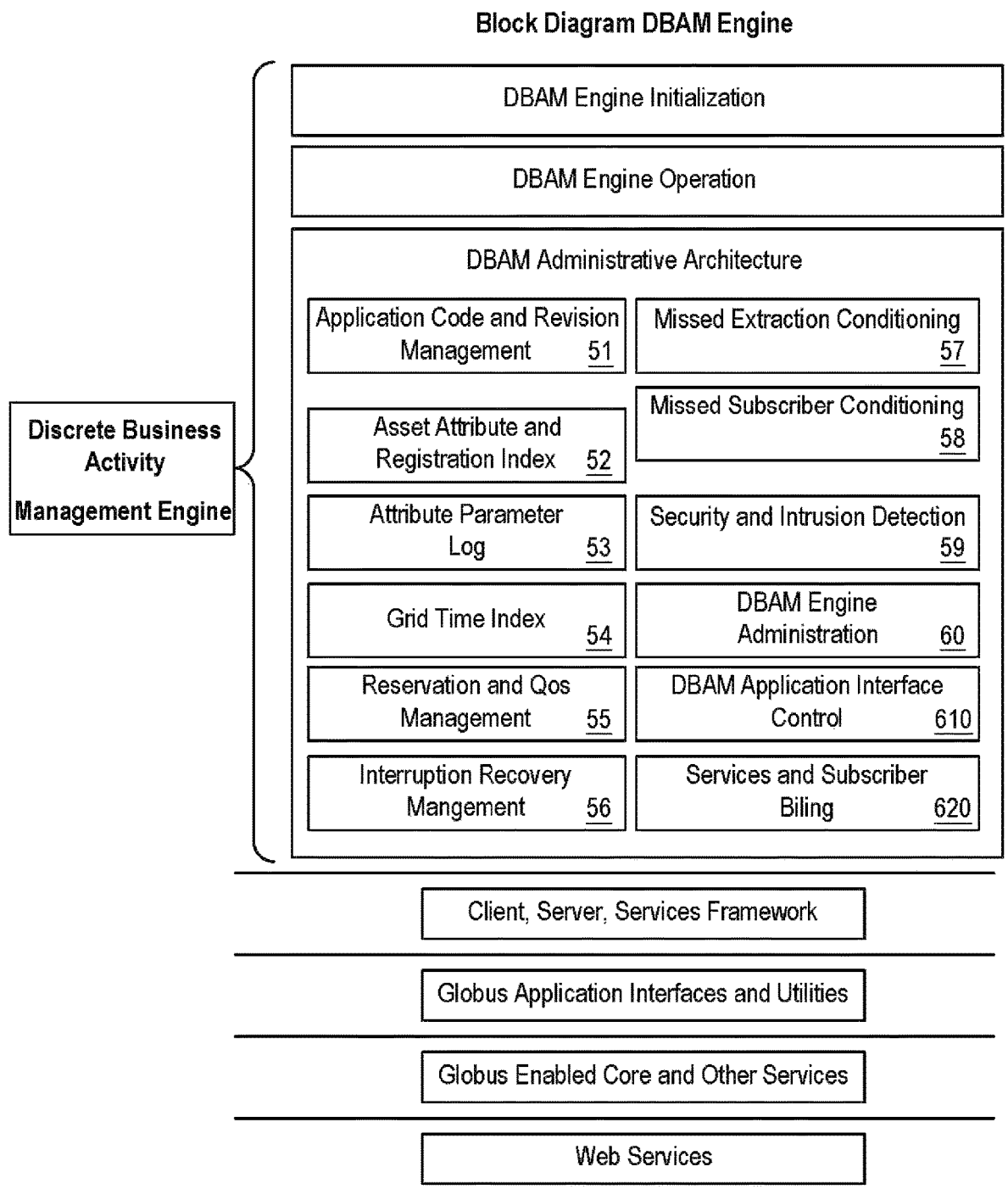
FIG. 5 is a diagram of a preferred embodiment of a DBAM engine's administrative architecture.

FIG. 5 is a diagram of a preferred embodiment of a DBAM engine administrative architecture. All the elements are optional, can be applied in any combination, and are not limited by the ones mentioned.

The application source code and revision management 51 is designated for a module responsible to manage DBAM software, code revisions and/or insure subscriber code interface compatibility. The module functions include, but are not limited to, distribution and maintenance of DBAM software to registered resources. Examples include code updates, protocol revisions or patches. Software compatibilities may be managed by monitoring subscriber application revisions called by DBAM functions. Optionally, diagnostic or other test routines may be created to insure ongoing functional compatibilities, or acceptable performance levels between interfacing software elements.

The asset attribute and registration index 52 is designated for a module which may maintain a storage log of all DBAM computational results for each processing step, by subscriber and attribute, in addition to all DBAM subscriber registrations. This index may be used to support reporting inquiries of a subscriber or to support the interruption recovery management function for DBAM attributes, or may be referenced by DBAM application administration modules as well for interruption recovery management or for other attribute data requests.

The attribute parameter log 53 is designated for a module which may maintain the log and is contacted at the time by subscriber resources containing registered attributes whose parameters arbitrarily change through random events, such as a part number, revision or other attribute parameters including but not limited to physical specification, context or taxonomy. This log is polled in real time to insure that prior to the initiation of business mosaic frame generation, all attribute parameters requiring log maintenance are current with respect to the Grid Time Index and can be merged with time dependent parameters of the same attribute, such as inventory level, to preserve attribute representation integrity.

The grid time index 54 is designated for a module which may establish the time index for each business mosaic frame, and/or its associated attribute parameter sets. The module specifies the universal time for which all subscriber attribute parameters are to be extracted for all relevant subscribers within a business partner Grid, and by which all DBAM applications may expand reference business mosaic interpretations and support autonomic business functions. The reservations and QoS management module uses the time index to obtain reservations from within designated subscriber resources for extraction on or shortly after the grid time index. Subscribers not extracting attribute parameters at the grid time index may be required to normalize asset parameter data. Each asset business mosaic successively created in time has its own identifying grid time index, which is advanced in time at preset intervals which may or may not be uniform.

The reservations and QoS management 55 is designated for a module which may provide DBAM engine supervisory management over all module functions and DBAM applications to insure that all relevant subscriber attribute parameter data is maintained, data processing operations are supervised and/or completed, each asset business mosaic cycle is successfully created in time, and properly sequenced with successive business mosaics. Management tasks include Grid resource reservation and coordination based on program requirements, accounting for data exchange, completion of jobs, data requisites, concurrent DBAM applications, Grid supervisory functions or services (either current or future specified), and prioritization of other administrative module functions within DBAM applications. Module functionality also includes the performance monitoring of traffic or resource optimization within DBAM and in relation to performance monitoring of DBAM applications which may be enabled by customized or third party programs currently or expected to be marketed for such use.

The interruption recovery management 56 is designated for a module which may scan the QoS Management function to discover unsuccessful data processing operations, resets or reinitiates processing sequences if possible, including routing operations to alternate resources or alerts QoS Manager to irresolvable problems for administrative intervention. Based on the grid time index of the business mosaic, and using the asset attribute index, failed data operations may be later recovered by re-running data sequences with repaired resources and archived data, or using missed extraction, or subscriber conditioning methods.

The missed extraction conditioning 57 is designated for a module which may provide data conditioning services in the event that the interruption recovery management 56 is unsuccessful in correcting a data processing error within an acceptable time interval. If invoked, the module provides arbitrary extraction data, based on a best fit curve modeling projections from prior extractions for appropriate parameters. These arbitrary extractions may later be replaced and the business mosaic updated, if parameter data can be recovered from resources at a later time.

The missed subscriber conditioning 58 is designated for a module which may provide data conditioning services in the event that a business partner Grid is incomplete. In this case, the entity registration reflects such a condition and requires the subscriber to specify which "surrogate" business partners may be used to in proportion, to approximate the behavior of the missing partner subscribers. When invoked, the module provides arbitrary extraction data, based on a best fit curve projections from designated subscriber extractions. Arbitrary extraction data may later be possibly replaced and the business mosaic updated, with the subscribing of the missing partners.

The security and intrusion detection 59 is designated for a module which may incorporate commercially available security and intrusion detection functions and practice into the business partner Grid subscriber infrastructure supporting the DBAM engine, and DBAM engine applications, and/or hosted by DBAM. The module manages distributed virtual subscriber privacy domains by monitoring and at a subscriber's option, verifying the flow of all information filtered of proprietary content and the prevention of unfiltered data flows throughout the Grid, originating from the subscriber to provide assurance to the subscriber of access permissions and secure data routing compliance. The module also manages local virtual subscriber privacy domains, by monitoring the containment of encrypted and sensitive attribute data generated in connection with DBAM or DBAM applications, within a subscriber's firewall or elsewhere within designated firewall to provide assurance to the subscriber of access permissions and data confidentiality. The module also manages random subscriber access and content requests through a controlled process of subscriber authorization and traffic content monitoring.

The DBAM Engine administration 60 is designated for a module which may provide DBAM engine performance metrics used to manage engine functions. This module may incorporate commercially available resource load balancing tools or other traffic management schemes, be used to lower synchronization overhead or make more efficient use of subscriber or third party infrastructure resources. Key module functionality includes, but is not limited to, QoS priority over all DBAM elements within the hosted Grid including diagnostic and prioritized management of DBAM subscriber initialization, DBAM business mosaic generation and coordination of DBAM application registration expansions, extractions, interpretations and autonomic functions. The module maintains a master-slave relationship over all DBAM application administration modules, or external application DBAM call functions.

The DBAM application interface control 61 is designated for a module which may provide the interface control to all DBAM applications. Module functionality includes subscriber solicitation for DBAM applications, invocation of the selected application's registration procedure and update of DBAM registrations. Additionally, the module activates the DBAM application and provides reference business mosaic extractions at registered intervals to support application function. The module also regulates and supports data exchange activity between multiple DBAM applications to maintain reference business mosaic time index congruence, and between DBAM and application interruption recovery modules. With respect to external applications, the module retrieves or supplies externally requested information on the basis of subscriber registration preference, but does not permit invasion of the DBAM engine or prioritization of its registered resources by an external body.

The services and subscriber billing 62 is designated for a module which may manage subscriber rates, services eligibility and/or maintains records of usage for subscriber billing of DBAM services. Additionally, the module manages the actual billing and invoicing for services to subscribers, incorporating all DBAM engine applications based on master-slave relationships with each application module's administrative architecture.

All the modules are not limited or defined by the capabilities listed.

Figure 6:
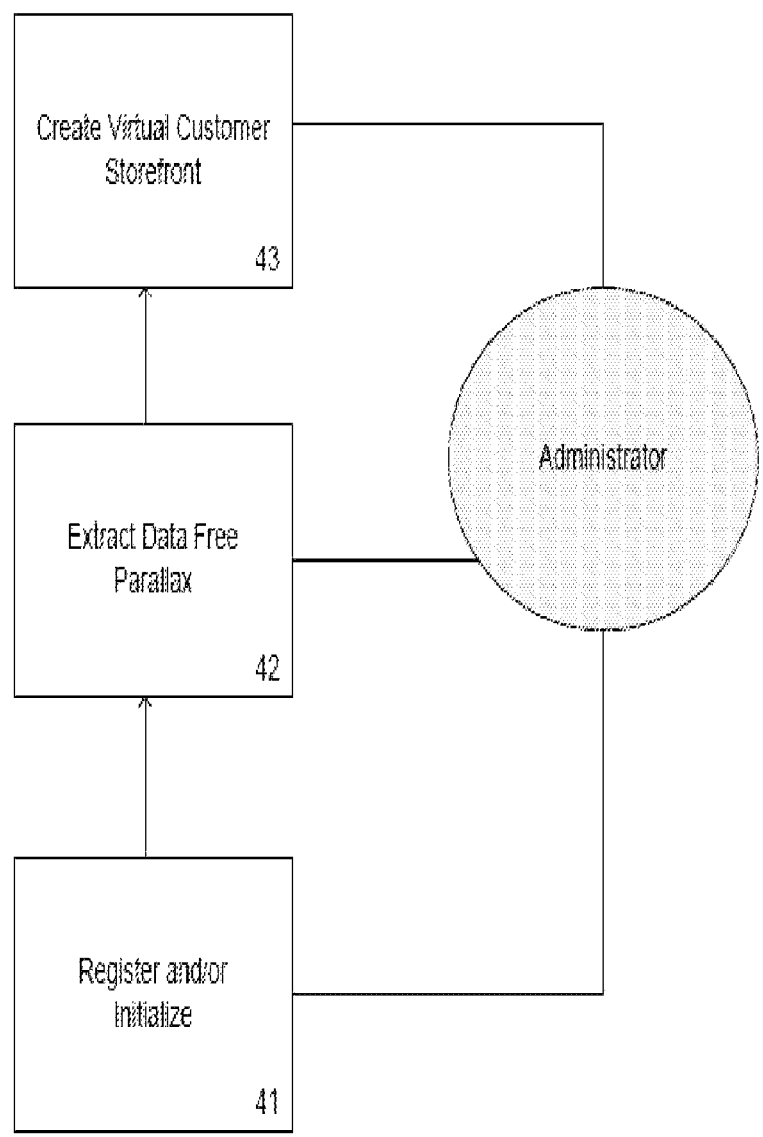
FIG. 6 is a general block diagram for a method for buy on demand.

FIG. 6 is a general block diagram for a method for buy on demand (BOD). Buy on demand allows a business to utilize a universal business activity mosaic created by a DBAM engine, or a functional equivalent agent, to render a virtual customer storefront, whereby a business may discretely witness in time and character the sale of its own assets and services either fully or partially comprising those sold to anybody of related intermediate or end customers. Purposes include, but are not limited by, the following: purchasing, selling, financing, warehousing or physically transporting assets on demand. Any combination of the stated purposes may also be applied.

Instant advantages of the BOD include, but are not limited to: (i) Unlike commercial supply chain "optimization solutions" which are applicable in the entity domain and with business partners from the perspective of the entity, the invention coincidentally and concurrently overlays all entity optimization solutions as if all entities were one—one single asset mosaic—regardless of the entity perspective, for the purpose of reaching unequivocal, mutual procurement decisions across combinations of entities; (ii) May be employed as a method by asset delivery service providers for immediate, or near immediate sale to customer, following mutual recognition of sales order by service provider/customer, to customer's customer, resulting in a near coincident customer accounts payable and accounts receivable cycle, or short cash cycle; (iii) Method may enable the deployment of accompanying semi or fully autonomic commercial procurement schemes.

Initially, the buy on demand may require a registration and/or initialization 41 which may request, either by human or computer, any combination, but is not limited by, the following: BOD service registration; BOD resource registration and access permissions; attribute registration; BOD core application performance preferences; and BOD autonomic function preferences.

The BOD service registration includes, but is not limited to, the process by which the subscriber and source(s) entities alter their requisite DBAM engine, or a functionally equivalent agent, registration to include election of BOD services. Service elections may include options such as: selection of autonomic function, choice of application service levels, service rates, period of subscription, scope of deployment within entity, or other related fee/non-fee service options based on subscriber preference.

The BOD resource registration and access permissions includes, but is not limited to, the process by which an entity expands DBAM engine, or a functionally equivalent agent, registration to include internal entity or a third party compute resource, storage, network resources, and/or access permissions for operation, and/or administration of BOD. Access to resources and permission to access data, run programs and distribute processed data is securely restricted within the DBAM engine, or functionally equivalent agent, unless otherwise specified by entity. In accordance with resource registration, the DBAM engine, or a functionally equivalent agent, may require deployment of thin client software on entity resources in connection with the DBAM engine, or a functionally equivalent agent, host, or alternatively be completely hosted by the DBAM engine, or functionally equivalent agent. Also in accordance with resource registration, BOD user interfaces are configured for and accessible by entity, or users designated by entities such as contracted service providers.

The attribute registration includes, but is not limited to, the process by which an entity expands the DBAM engine, or a functionally equivalent agent, registration to select a list of business attributes for inclusion by autonomic application within BOD, based upon the DBAM engine, or a functionally equivalent agent, attributes already registered and mapped between entities.

The BOD core application performance preferences include, but are not limited to, the process by which an entity expands the BOD registration for attribute interpretation. Attribute interpretation requires the specification and/or selection of an identical method of stochastic modeling for use in the generation of service level profiles. Additionally, subscriber or source attribute inputs may be necessary to support the function of selected stochastic models such as, but not limited to, delivery lead times, service level performance, buffer stock held, minimum fulfillment quantity, and freight mode options. Treatment of parameter error differentials between subscriber, intermediate and end customers requires subscriber preference to base actual service level profile on the greatest error, error associated with the end customer, an average of all errors, or other subscriber specified scheme. Alternate service level profile groupings require specification of attribute groups, by type, by region, by subscriber customer, or other subscriber specified criteria. Additionally, GUI, file transfer/distribution preferences and permissions may be required to support registration input and proprietary display of interpretative results.

The BOD autonomic function preferences includes, but is not limited to, the process by which an entity expands the BOD registration to include subscriber defined threshold values, groupings, relative functions, logical arguments, or processing frequencies for analysis of attribute parameters, in addition to linkage with other DBAM engine's, or a functionally equivalent agent's, applications. These values may be used in part, to form an intelligent rule base along with other subscriber defined performance criteria necessary for each autonomic function to provide its subscriber with logical business recommendations or serve as the basis for logical action. Parameter threshold values associated with each attribute include, but are not limited to delivery service level agreement, purchase increment, imminent time period for the generation of purchases based on bookings, purchase interval or lead time interval for attribute processing or transport, or forecast horizon intervals. Attribute groupings include, but may not be limited by royalty only assets versus sell-buy assets, attributes with FOB origin or destination classification, minimum relative asset purchase quantities or configurations to comply with integral configuration product or service specification, import export attribute parameter data groupings for document assembly, attribute preferred service provider assignments such as for logistics or warehousing, asset class, regional designation or parameter type. Relative functions include but are not limited to third party optimization software packages for evaluation of capacity and determination of optimized asset or service availability (such as i2), source service level rate schedules for delineated delivery performance, or incremental resource utilization relationships based on transfer behavior. Logical arguments used for the support of autonomic functions may include, but are not limited to procurement authorization schemes, or delivery versus freight mode preferences. Processing frequencies for specified autonomic function execution may include, but are not limited to correction cycle frequencies for use in establishing the period of time between source responses are mandated in reaction to subsequent attribute transfer parameter changes within reference business mosaics, procurement frequencies for use in establishing the time period between successive considerations of new purchases by a subscriber. Other autonomic applications may be specified by the subscriber within the DBAM engine's, or a functionally equivalent agent's, registration for operation in parallel to BOD or other attribute business mosaics constructed between business partners. At subscriber option, additional user defined functions such as expanded user interface, file transfer or compute steps between autonomic applications may embody the complete preference specification. GUI, file transfer/distribution preferences and permissions may be required to support the proprietary display of all autonomic function preferences in use by the DBAM engine, or a functionally equivalent agent, and BOD.

The BOD extracts data that is data parallax free 42. The extraction may be done by where the subscriber and source provider reference business mosaics are extracted from the same universal business mosaic at a selected frequency which is an integral multiple of the business mosaic time index. Additionally, the reference business mosaics may be extracted from the configured DBAM engine's, or a functionally equivalent agent's, resources and transferred to the resources so specified by the BOD registration. A diagnostic function verifies comprehensive registered attribute representation, data element integrity, and synchronization. Incomplete or defective data may be mathematically approximated from prior frames, autonomic recalculation by agent, or otherwise resolved by administrative judgment within BOD. Integral data is maintained within the specified privacy domain for subsequent manipulation.

The BOD creates a virtual customer storefront 43. One embodiment of creating the virtual customer storefront includes interpretation of reference asset business mosaics and profiling, which could be a process by which subscriber and service provider or source reference business mosaics are overlaid, conditioned, interpreted, and profiled to quantify and synchronize asset transfer behavior between entities. BOD overlays or superposes reference business mosaics of both subscriber and source to provide a consensus view of business activity to both parties. Overlay is achieved by translating the subscriber asset states to the service provider or source asset states, thereby providing an isolated view of business activity between subscriber and service provider without distortion from other subscribing customers for the same attributes. Conditioning of attribute data requires a discrete, but subscriber adjustable stochastic model as specified within BOD registration to be constructed to quantify and represent the asset transfer behavior in time of asset attributes and associated parameter values for all intermediate and end customer groups within the overlaid reference business mosaics. Conditioning also requires the incorporation of an ideal, specified stochastic asset transfer behavior model as specified within BOD registration, uniquely defined for each attribute by a subscriber within BOD registration for the prevailing business activity level described within both reference business mosaics. Mathematical reconciliation of both ideal and representative stochastic models within a business mosaic provides a series of error signals containing projected discrete asset transfer behavior parameter differentials comparing prevailing source-subscriber asset transfer behavior to prevailing intermediate and end customer asset transfer behavior for the same attribute. Each error signal series for each attribute is interpreted based on subscriber registered preference for each reference business mosaic frame to either select a single or permutation of error signals which the source may use to base subsequent asset transfer behavior. Selected parameter differentials are interpreted to quantify corrected source asset transfer behavior between source and subscriber for compliance with ideal stochastic model specified transfer levels. Actual service levels are profiled on the basis of committed source versus corrected levels of asset transfer behavior for each attribute. Profiles may be grouped together as specified within the subscriber registration. All profile representations are viewable by subscribers and service providers or sources based on registered access permissions through the use of graphical user interface or other file transfer mechanisms specified within core application preferences.

The following are optional, but not limiting, configurations of autonomic business functions that utilize a BOD: autonomic agent for management of service level performance; autonomic procurement agent; autonomic agent for logistics management; autonomic agent for resource and/or service consumption planning; autonomic agent for use in connection with zero cash cycle.

An autonomic agent for management of service level performance may include a BOD agent which functions to translate actual and desired service level profile differentials for individual or group attributes into source transfer behavior correction inquiries, obtain confirmations or responses to such requests and update actual service level profiles. Correction inquiry responses are based on the corrected attribute parameters evaluated with respect to source internal capacity exclusively dedicated to the subscriber and may be determined using asset assembly optimization "what if software" such as commercially supplied by i2 Inc., resident within the registered resources. The BOD agent to revise each attribute's actual service level profile incorporates correction responses presented and confirmed by the source. Correction cycles are administered at intervals specified within the BOD registration. Optionally, this BOD autonomic agent may be used to support a royalty transaction model whereby an asset royalty is transacted directly to the customer by the source while the asset itself is transacted directly between the source and the customer's customer. Optionally, the BOD autonomic agent may be used to administer a variable fee for variable service level option whereby a subscriber may decide to accept a higher or lower service level from a source in exchange for premium fee or discount fee in assessed by source in connection with attribute transfers.

An autonomic procurement agent may include the BOD agent to repeatedly execute the purchase and receipt of goods at a point coincident in time when offsetting customer sales orders are received or imminent for specific attributes. The agent utilizes source confirmed asset transfer behavior and coupled with actual service level profiles, confirms transfer behavior with respect to the subscriber and subscriber's customer and initiates a procurement order on a an imminence interval, volume increment, prevailing source attribute cost, or other specified order prerequisite specified within BOD registration. The agent obtains authorization from the subscriber based on BOD registration, forwards and receives confirmation from the source for the order and updates the appropriate attribute parameter.

An autonomic agent for logistics management may include the BOD agent to determine and administer logistics tasks required to deliver assets in accordance with desired service level asset transfer behavior between source and subscriber. Tasks include by reference to specifications within BOD registration, but not be limited to, the evaluation of customer destinations, desired arrival times, freight mode preference, and exportation or importation document assembly for inclusion in request for delivery placed with a logistic services provider. The agent, through direct linkage with a selected logistics provider or through a competitive sourcing method such as BTM or directly with an exchange entity, would seek confirmation for the delivery request, authorize based on BOD registration, receive ship confirmation and customer receipt.

An autonomic agent for resource or service consumption planning may include the BOD agent to forecast asset transfer behavior and determine or synchronize resource consumption with asset flows. Utilizing actual service level profiles or groups of profiles extending through a specified time period and frequency, the BOD agent can link respective common attribute parameters within a subscriber or source ERP planning bill function to align future align asset consumption rates with prevailing business levels plus or minus subscriber or source defined arbitrary demand inputs. Additionally, the BOD agent may, based on pre-determined human resource, facility, services utilization, expense or other consumed business attribute relationships to attribute transfer behavior, specified within BOD registration, determine profiles and alerts to anticipated over or under consumption of entity resources or services.

An autonomic agent for use in connection with zero cash cycle expands to administer customer invoicing and interface with the zero cash cycle application. Based on attribute transfer behavior, FOB terms, attribute pricing, or other specified source requirements for attributes included within BOD registration, the BOD agent may generate invoices for release to subscriber from the source asset provider. Working as a slave to the zero cash cycle application, and based on BOD subscriber and source registrations, the BOD agent can manage interactive services such as requests for financing of purchases and responses to dispositions returned from the zero cash cycle application. Optimal functionality by BOD agent and zero cash cycle application requires subscriber and source independently register for zero cash cycle services.

Optionally, BOD may couple asset flow related management functions with other attribute evaluation schemes of synchronous or asynchronous business activity representations between related business partners.

Figure 7:
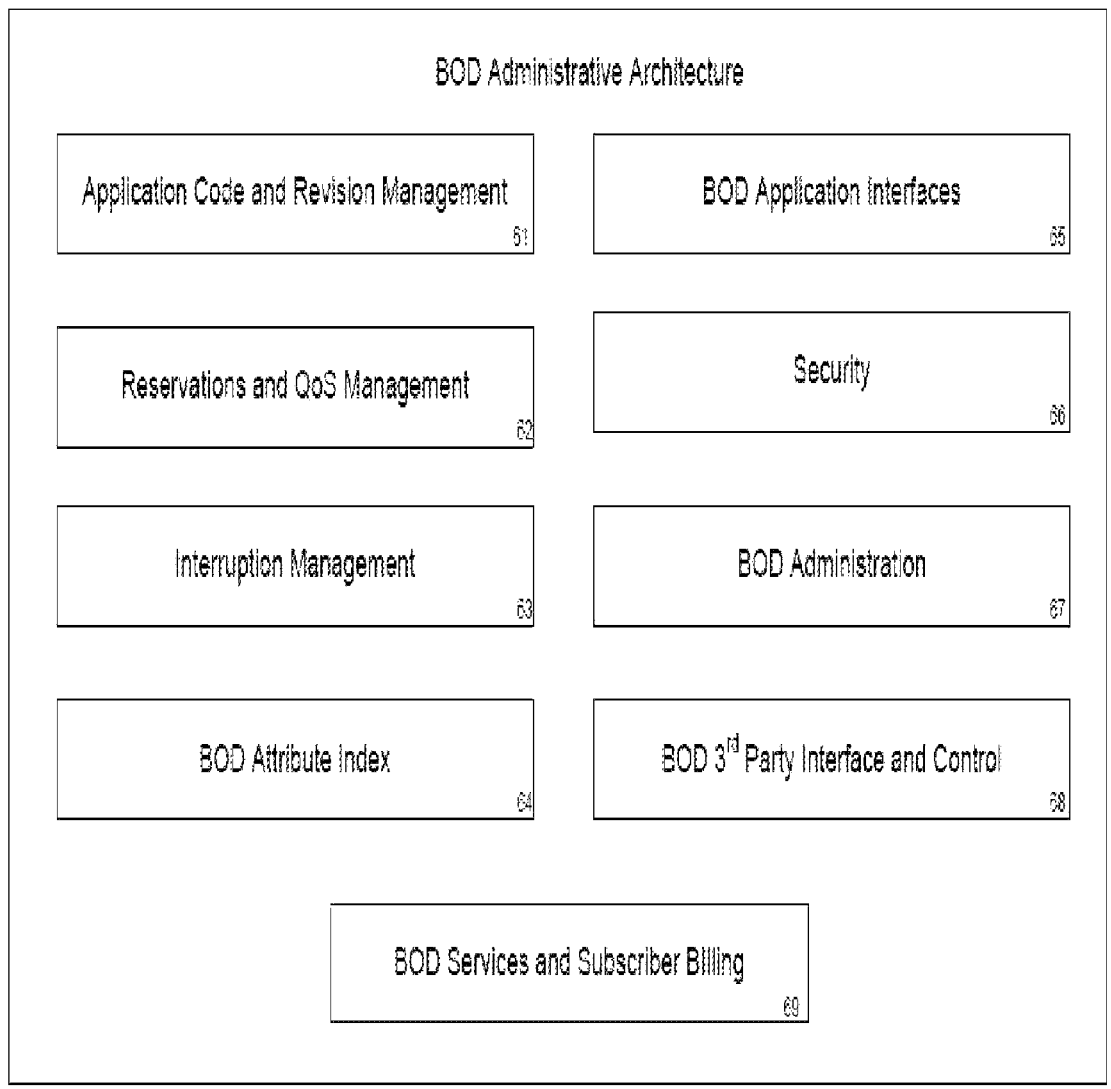
FIG. 7 is a diagram of a preferred embodiment of an administrator of buy on demand.

FIG. 7 is a diagram of a preferred embodiment of an administrator of BOD. All the elements are optional, can be applied in any combination, and the administrator is not limited by the elements mentioned.

The application source code and revision management 61 is designated for a module responsible for managing code revisions and/or insure subscriber code interface compatibility. This module functions include, but are not limited to, distribution and maintenance of BOD software to registered resources, such as with code updates, protocol revisions or patches. Software compatibilities may be managed by monitoring subscriber application revisions called by BOD functions. Optionally, diagnostic or other test routines may be created to insure ongoing functional compatibilities, or acceptable performance levels between interfacing software elements.

The reservations and QOS management 62 is designated for a module responsible for the orchestration of BOD execution across the scope of registered resources. This module's functionality extends to management of successive BOD analytical and/or autonomic interpretative cycles for time indexed reference business mosaics. Management tasks include Grid resource reservation and coordination based on program requirements, accounting for data exchange, completion of jobs, data requisites, concurrent DBAM applications, Grid supervisory functions or services (either current or future specified), and prioritization of other administrative module functions. Module functionality also includes the performance monitoring of traffic or resource optimization which may be enabled by customized or third party programs currently or expected to be marketed for such use.

The interruption management 63 is designated for a module responsible for monitoring and/or reconciliation of missing data elements within an attribute parameter array, missing subscribers, or malfunction of registered resources. This module's functionality includes the assignment of temporary, arbitrary parameter array data elements for based on mathematical conditioning of prior data values from prior business mosaic time indices and later substitution of correction through conditioning with respect to values extracted from subsequent business mosaics frames. Module functionality for monitoring and reconciliation for missing subscribers includes DBAM subscriber business partner monitoring and smoothing of trend behavior across and within a group of subscriber customers. Trend behavior for a given missing attribute can be accomplished by applying, in proportion to business activity representation detected as missing by way of a source or group of source attribute providers, trend behavior for like attributes quantified by subscribers present at the consumption level. Optionally, other known mathematical techniques that solve missing matrix data elements may be incorporated within the module provided that data uncertainty is maintained within a realm of practical utilization. Module monitoring for the malfunction of registered resources includes a capability to temporarily order deployment of alternate resources in the event of detected resource operating error. Optionally, commercially available resource monitoring utilities may be incorporated within the module to support its intended function.

The BOD attribute and interpretation index 64 is designated for a module responsible for maintaining the data archiving of attributes and their respective parameters, interpretations made from the parameters, and/or autonomic function results accessible for interruption management, subscriber or service provider specified exportation for secondary analysis or other permitted usage such as for additional derived autonomic business functions. The index module also may record the resource location of stored data archives.

The BOD user and application interfaces 65 is designated for a module responsible for managing BOD user interface configurations. Functionality of the module includes, but is not limited to, maintenance and periodic update of user interfaces permitted or restricted for use by DBAM administrators or clients. Interfaces are defined GUI's or other interface methods available on any user or administrative hardware access platform for the purpose of viewing, managing or applying the BOD operation. Access to and selection of interfaces would be specified based on subscriber registration or DBAM administrative permissions.

The security 66 is designated for a module responsible for managing the security and management of secure information transfer between BOD specified resources and within and between proprietary or other domains. Module functionality includes the logging of session access to resources and information based on specified permission and user, as well as logging of proprietary information exported transferred to specified resources. The module provides the subscriber and DBAM with a mutual view of permissible and non-permissible access and information activity and optionally may be used by subscriber or administrator to override or cancel registered permissions. The module defers to the DBAM security module for the administration of overall DBAM intrusion, data encoding and other state of the art management methods to securely manage resources and the network supporting DBAM and 0CC.

The BOD administration 67 is designated for a module responsible for providing administrative control over all BOD functions. Key module functionality includes, but is not limited to, diagnostic and/or prioritized management of subscriber initialization and BOD application functions, as well as BOD modules within the administrative architecture. The module also is a slave to the DBAM administrative module and manages coordination and priority of resources utilization requests, security, referencing indexing of data in relation to the DBAM administrative module. Concurrent function of BOD with addition internal DBAM applications such as BTM, PBAM, 0CC or others may be within a master or slave controlled context by the BOD administration module to the extent desired, higher level specified interactions between applications warrant certain prioritization or sequencing of computation or functions.

The BOD external third party interface and control 68 is designated for a module responsible for controlling BOD functionality with internal or external logistics or warehousing management services. Concurrent function of BOD with logistics management services is limited to the exchange of certain attribute data, including but not limited to attribute parameter data based on subscriber preference, working without explicit QoS controls between BOD and third party operations. Optionally, the BOD administrative module may be embedded within the fabric of a third party logistics or warehousing service as a master or slave controller for the purpose of expanding synergy functions with DBAM such as applying QoS controls to forecast logistics resources in specific locations, anticipate warehousing volume, synchronize asset transport between dissimilar business partner groups, or other germane functions.

The BOD services and subscriber billing 69 is designated for a module responsible for providing rate schedules for BOD services for subscriber confirmation during registration. The module is a slave to the DBAM billing module for interval usage and direct subscriber billing and account consolidation, or for billing of BOD service on an account basis to a service provider for resale to a client.

Some other optional routines and modules which might exist include, but are not limited to additional software routines within each module may be incorporated to support expanded BOD administrative functionality for subscriber or service provider specified business activity attribute management applications. Additionally, other optional modules may be added to the BOD administrative architecture for evolution or expansion of functional performance, application interfaces, security capability, diagnostics, or to satisfy incremental subscriber specified business capability.

Figure 8:
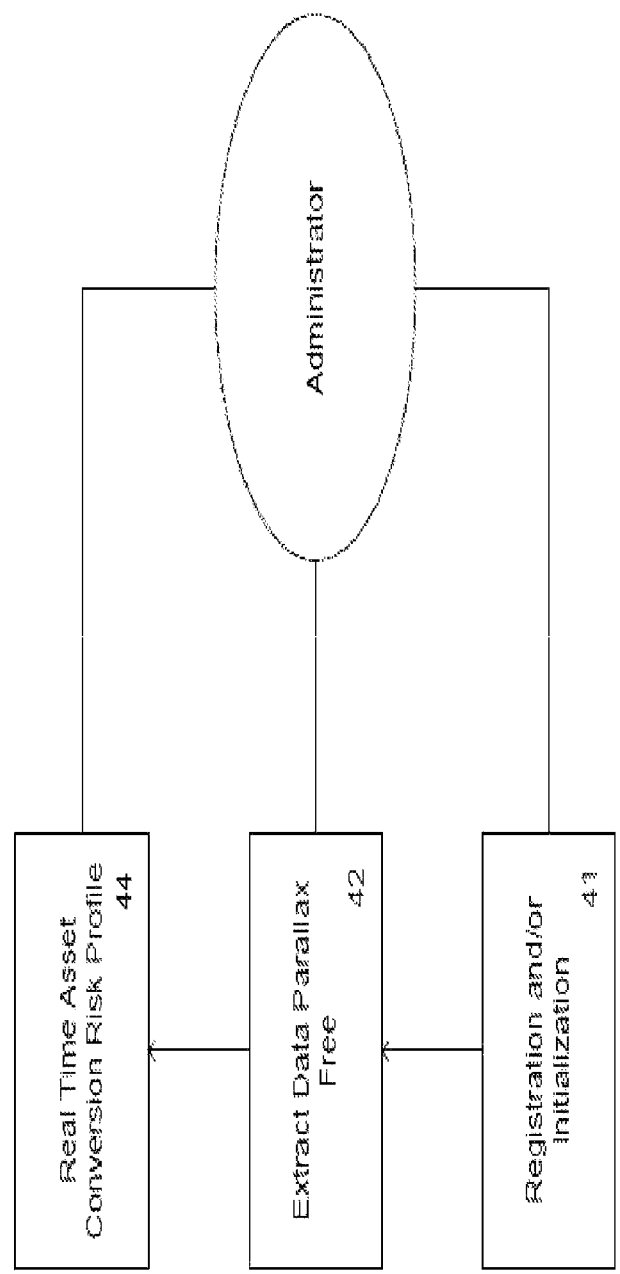
FIG. 8 is a general block diagram for a method for zero cash cycle.

FIG. 8 is a general block diagram for a method for zero cash cycle (0CC). 0CC allows a business to utilize a universal business activity business mosaic created by a DBAM engine, or a functional equivalent agent, to derive an entity's near or real time asset conversion risk profile from the interpretation of concatenated entity asset conversions and other specified risk determinants within time-indexed asset business mosaics. Purposes include, but are not limited by, deriving and/or providing of risk management or credit services. Any combination of the purposes may also be applied.

Instant advantages of 0CC include, but are not limited to: (i) It may be incorporated by commercial lenders or Moody's KMV/Stucky's Nova Series commercial risk management solutions to complete loan formulas necessary to classify loans, and establish rates in connection with the creation of commercial raw material purchase credit facilities, funded by sellers; (ii) It may be used to electronically and actively monitor entity's performance or payment risk profile, or administer loan availabilities; (iii) Method may comply with Basel Capital Accord II Operational Risk Management Standards for commercial lenders, a regulation mandated by the Federal Reserve in 2005; (iv) Method may enable a new prime (or sub-prime) lending rate loan product for sellers (to fund) through a low cost means of quantifying pay/performance risks for vast client and base of qualified entities that typically buy inventories. The product costs significantly less than self-funded seller fast pay discounts, while actually extending terms to a qualified buyer; (v) Loan products sustained by this method may also be used in connection with the on-line exchange financing of commercial materials; (vi) Method may enable the creation of business credit scores analogous to Fair Isaac Company (FICO) scores for consumers.

Initially, the 0CC may require a registration and/or initialization 41 which may request, either by human or computer, any combination, but is not limited by, the following: 0CC service election; 0CC resource registration and access permissions; attribute registration; 0CC core application performances preferences; and 0CC autonomic function preferences.

The 0CC services election includes, but is not limited to, the process by which an entity alters the requisite DBAM engine's, or a functionally equivalent agent's, registration to include election of 0CC services. Service elections may include options such as: selection of autonomic function, choice of application service levels, service rates, period of subscription, scope of deployment within entity, or other related fee/non fee service options based on subscriber preference.

The 0CC resource registration and access permissions includes, but is not limited by, the process by which an entity expands the DBAM engine's, or a functionally equivalent agent's, registration to include internal entity or third party compute resource, storage, network resources, and access permissions for operation, and administration of 0CC. Access to resources and permission to access data, run programs and distribute processed data is securely restricted within the DBAM engine, or a functionally equivalent agent, unless otherwise specified by entity. In accordance with resource registration, DBAM engine, or a functionally equivalent agent, may require deployment of thin client software on entity resources in connection with the DBAM engine's, or a functionally equivalent agent's, host, or alternatively be completely hosted by the DBAM engine, or a functionally equivalent agent. Also in accordance with resource registration, 0CC user interfaces are configured for and accessible by entity, or users designated by entities such as contracted service providers.

The attribute registration includes, but is not limited to, the process by which an entity expands the DBAM engine's, or a functionally equivalent agent's, registration to select a list of business attributes for inclusion by autonomic application within 0CC, based upon the DBAM engine's, or a functionally equivalent agent's, attributes already registered and mapped between entities. Optionally, mapping may be expanded for authorization of some or all business attribute parameter distributions to 0CC third party service providers.

The 0CC core application performance preferences includes, but is not limited to, the process by which the subscriber or source expands the DBAM engine's, or a functionally equivalent agent's, registration to included certain attribute parameters and designate risk management models on behalf of a lender or risk management service provider, or other for use in profiling a source or subscriber's near or real time attribute conversion risk. The DBAM engine's, or a functionally equivalent agent's, registration is also expanded to include certain attribute parameters and designate cash flow management models for use in profiling source or subscriber's near or real time cash flow. Attribute parameters required to profile risk may include, but are not limited to, those describing attribute transfer behavior for assets, designation of reference sales prices of discrete source or subscriber assets, accounts payable or accounts receivables records, contract in force records, or other parameters beyond those included within attribute transfer behavior summaries within the DBAM engine, or a functionally equivalent agent, required by specified risk management models. Stochastic mathematical or logical risk management models based on typical industry loan loss, payment risk and performance risk, asset valuation approximation formulae across a reference business mosaic may be selected by the source or subscriber at time of OCC registration or imported lender or third party risk management service models selected. Attribute parameters required to profile cash flow may include, but are not limited to those describing attribute transfer behavior for cash or other parameters beyond those included within attribute transfer behavior summaries within the DBAM engine, or a functionally equivalent agent, and required by specified cash flow management models. Stochastic models utilized in connection with standard FASB procedures for calculating cash flow may be selected or amended by the source or subscriber at the time of OCC registration. Generated risk profiles may be evaluated by specified attribute groupings and generated at specified intervals. Cash flow profiles for an enterprise may be generated at specified intervals.

The OCC autonomic function preferences includes, but is not limited to, the process by which ail entity expands the DBAM engine's, or a functionally equivalent agent's, registration to include subscriber defined threshold values or groupings for analysis of attribute parameters, incorporation of intelligence yielding subroutines, or linkages with other DBAM engines, or a functionally equivalent agents, or external applications. Threshold values and groupings specified for the analysis of attribute parameters related to risk may include, but are not limited to payment risk, performance risk, loan loss, asset valuation, receivables, purchase discounts, lending availability and credit limits, loan classifications relationships to risk profiles, securitization relationships to availabilities, loan call recovery periods, cash maintenance limit for influx, cash maintenance limit for surplus, payables and receivables transaction limit alerts, receivables financing alerts, and profile update frequencies assigned to risk management, loan monitoring and loan administration subroutines. Intelligence yielding subroutines may include but not be limited by: (i) lenders or third party risk management service provider risk models which manipulate attribute parameters related to risk to derive a specified score or other quantitative method of reducing a subscriber or source's business risk down to a finite set of meaningful meta-risk profile measures; (ii) unique loan monitoring subroutines supplied by lending institutions and used to satisfy regulatory and ongoing internal loan management duties; or (iii) loan administration subroutines such as for the management of revolving credit facilities based on the regular, comprehensive evaluation of source or subscriber financial fitness. Linkages specified for function of OCC with other DBAM engine, or a functionally equivalent agent's, applications or external applications include, but are not limited to: (i) BOD, as a slave for the purpose of requesting new loan evaluation with a lender, or transaction financing approval using and existing line of credit, (ii) BTM, as a slave for the purpose of requesting a new loan evaluation with a lender, or transaction financing approval using and existing line of credit, (iii) lender or third party risk management service provider, as a master or slave, depending upon the residence of the risk management operation relative to the lender or third party, (iv) securitization entity, as a slave to provide specified profiles. Additionally, GUI, file transfer/distribution preferences and permissions may be required to support the proprietary display of all autonomic function preferences in use by the DBAM engine, or a functionally equivalent agent, and OCC.

The OCC extracts data that is data parallax free 42. The extraction may be done by where the subscriber and source reference business mosaics are extracted from the universal business mosaic at a selected frequency, which is an integral multiple of the business mosaic time index. The reference business mosaics may then be extracted from the configured DBAM engine's, or a functionally equivalent agent's, resources and transferred to the resources so specified by the OCC registration. A diagnostic function verifies comprehensive registered attribute representation, data element integrity, and/or synchronization. Incomplete or defective data may be mathematically approximated from prior frames, autonomic recalculation by agent, or otherwise resolved by administrative judgment within OCC. Integral data may be maintained within the specified privacy domain for subsequent manipulation.

The OCC creates an entity's real time asset conversion risk profile 43. One embodiment of creating this profile includes interpretation of reference asset business mosaics and profiling, which could be a process by which risk management models are applied across reference business mosaics to determine the collective source-subscriber asset conversion risk profile, successive source-subscriber conversion risk profiles (as the subscriber becomes the new "source") and to profile source or subscriber cash flows. The conversion risk profile may be constructed by conditioning the attribute parameter elements used to support typical risk models employed by lending institutions, risk management service providers, or required by regulatory agencies within the source and subscriber reference business mosaics. The elements include, but are not limited to asset market valuation, entity payment performance, asset to receivables conversion, or others specified within OCC registration by a source or subscriber on behalf of a lender or risk management service provider. Asset valuations are conditioned from the reference business mosaics through the determination of a series of translated discounts (from a chosen entity asset reference price) integrated at each entity resale interval from intermediate to end markets and correspondingly applied to the source or subscriber entity's specific sale asset price. Based on OCC registration, intermediate, end market or a permutation of market discounts, as specified within the OCC registration may be used to assign a current valuation to a source or subscriber attribute. Entity payment performance is conditioned from the reference business mosaics through evaluation of a source or subscriber's cash balance, invoice payment record, or other attribute specified within the OCC registration by the source or subscriber on behalf of a lender or risk management service provider. Conditioning of asset to receivables risk conversion is achieved through the application of a discrete, lender or risk management service provider specified stochastic model as specified within OCC registration to be constructed to quantify and represent the asset transfer behavior in time of source or subscriber asset attributes. Using such a stochastic model, asset conversion probabilities may be assessed at each successive resale point based on prevailing asset transfer behavior between consecutive source and subscriber entities, or other factors such as contracts in force specified within the OCC registration. Conversion risks may be arbitrarily combined for successive resale points through to the end market using additional conditioning models to accommodate additional risk evaluation perspectives based on OCC registration. The basic elements used to support typical payment and performance risk models conditioned from the reference business mosaic may be assembled to determine the collective source subscriber asset conversion risk profiles using pre-defined lender or risk management service provider models specified within the OCC registration. Profiles can be grouped by attribute class or parameter type, source group, subscriber group, entity class (such as industry), regions or other dimensions in support of additional risk evaluations, such as for the assignment of credit scoring schemes, quantifying of risk for broad categories of attributes across multiple entities, or identification of asset valuations with respect to asset transfer behavior across broad categories of attributes and entities. Profiles can be generated from reference matrix extractions at regular intervals for incorporation within risk monitoring models or schemes, also specified within the 0CC registrations of sources and subscribers on behalf of lenders or risk management service providers. Cash flow profiles are determined based on payable balances and timing of obligations, receivables balances and timing of receipts, and may be expanded to incorporate other discretionary attribute elements such as employee payroll expense, or capital expense, or other related attributes included within the 0CC registration by the subscriber. Cash flow profiles are generated using FASB defined formulae or otherwise utilize schemes specified within the subscriber 0CC registration. All profile representations are viewable by subscribers, sources and service providers based on registered access permissions through the use of graphical user interface or other file transfer mechanisms specified within core application preferences.

The following are optional, but not limiting, configurations of autonomic business functions that utilize a 0CC: autonomic risk management agent; autonomic loan administration agent; autonomic working capital forecasting agent; and autonomic agent for asset securitization.

An autonomic risk management agent may include a 0CC agent as a platform to provide risk management services to third party credit rating agencies, risk management services, such as Moody's, or insurance actuarial services, on behalf of subscribers and source registrants. Risk management services could range in scope from the export of risk information or generated risk profiles in groupings or formats and frequencies predefined by third party agencies or services, by embedding third party agency or services' risk evaluation or management schemes within 0CC, such as for credit score assignment and entity or attribute monitoring, or other content exchange based on source and subscriber approval and 0CC registration. The representations of services generated by the autonomic agent are viewable by subscribers, sources and/or service providers through 0CC and the DBAM engine, or a functionally equivalent agent, based on registered access permissions through the use of graphical user interface or other file transfer mechanism.

An autonomic loan administration agent may include a 0CC agent to provide loan evaluation, administrative and or monitoring services to commercial lending institutions or their risk management service providers. Loan evaluation, administration and monitoring management services can range in scope from the export of risk information or generated risk profiles in formats and frequencies predefined by lenders or third party services, by embedding lender or third party services' pre-defined administrative or monitoring schemes within 0CC. Loan evaluation services may include determination of loan loss based on the deterioration of entity asset values within prevailing or projected market conditions reflected in attribute parameter profiles, source or subscriber on time payment history, or historical and current asset risk conversion, or other criteria specified by lenders and included by sources and subscribers for securitized loans or loans which are not securitized. Loan evaluation services could support the offering by lenders of securitized or loans which are not securitized products, such as for the discount purchase of receivables by lenders from sellers (sources) and the offer of extended terms to buyers (subscribers), at competitive rates based on the discernment of lender approved buyer risk evaluation levels. Active electronic loan administration and monitoring services include the determination of lending availability based on contracted lending rates and credit limits along with autonomic interaction with lender approval of source-subscriber purchases such as through BOD or BTM, or include the performance of other lender administrative tasks specified within 0CC registration. Additionally, active electronic loan administration and monitoring services include the refresh of asset risk, loan risk or other specified profiles, at specified frequencies and the export of profile update to lenders or their risk management service providers collectively included within the 0CC registration. Loan monitoring services could also support new loan classification, or the favorable reclassification of existing loans within a lender's portfolio based on the incorporation of 0CC risk evaluation criteria not present when the loan formula, or rate and classification system employed by the lender, was originally applied to determine the loan product. Based on evaluation of existing or additional specified risk profiles within the ace registration, a lender could effect loan reclassification and experience favorable impact on portfolio earnings or mandated reserves. In its current or modified form, ace active electronic loan administration and monitoring services may also comply with current or evolved regulatory requirements for credit risk modeling under current or subsequent revisions of the Basel Capital Accord. The representations of services generated by the autonomic agent are viewable by subscribers, sources and service providers through ace and DBAM engine, or a functionally equivalent agent, based on registered access permissions through the use of graphical user interface or other file transfer mechanism.

An autonomic working capital forecasting agent may include a 0CC agent to forecast near or real time working capital requirements for cash cycle management based on business activity reflected within a subscriber reference business mosaic frame. Working capital forecasts may be determined from modeling cash flow profiles generated from successive reference business mosaic extractions, whereby threshold levels for cash influx or surplus may be specified within subscriber ace registration. Cash cycles may be managed utilizing late receivables pay alerts, early payables alerts, 0CC enabling financing options for receivables, or other subscriber specified criteria. The representations of services generated by the autonomic agent are viewable by subscribers, sources and service providers through ace and DBAM based on registered access permissions through the use of graphical user interface or other file transfer mechanism.

An autonomic agent for asset securitization may include a 0CC agent as a platform to support the securitization of entity attributes to the extent that markets develop for the purchase and sale of quantifiable and tangible classes of attributes. For this application, 0CC could provide verification of the existence in abundance, ownership, and risk of conversion for designated class attributes, for such a commodity as computer memory, in accordance with securitization guidelines mandated by a regulatory body. Unless otherwise specified within 0CC subscriber registrations, verification of attributes would be determined through the use of asset risk conversion profiles and communicated to third parties utilizing 0CC and DBAM. The representations of services generated by the autonomic agent are viewable by subscribers, sources and/or service providers through 0CC and DBAM engine, or a functionally equivalent agent, based on registered access permissions through the use of graphical user interface or other file transfer mechanism.

Optionally, 0CC may couple risk and cash flow management functions with other non-DBAM engine, or a functionally equivalent agent's, attribute evaluation schemes of synchronous or asynchronous business activity representations between related business partners. 0CC may alternatively be coupled to operate with other DBAM engine, or functionally equivalent agent's, applications such as BTM or BOD in the context of a service provider offering or value add service, or to compound autonomic synergies for an individual subscribers.

Figure 9:
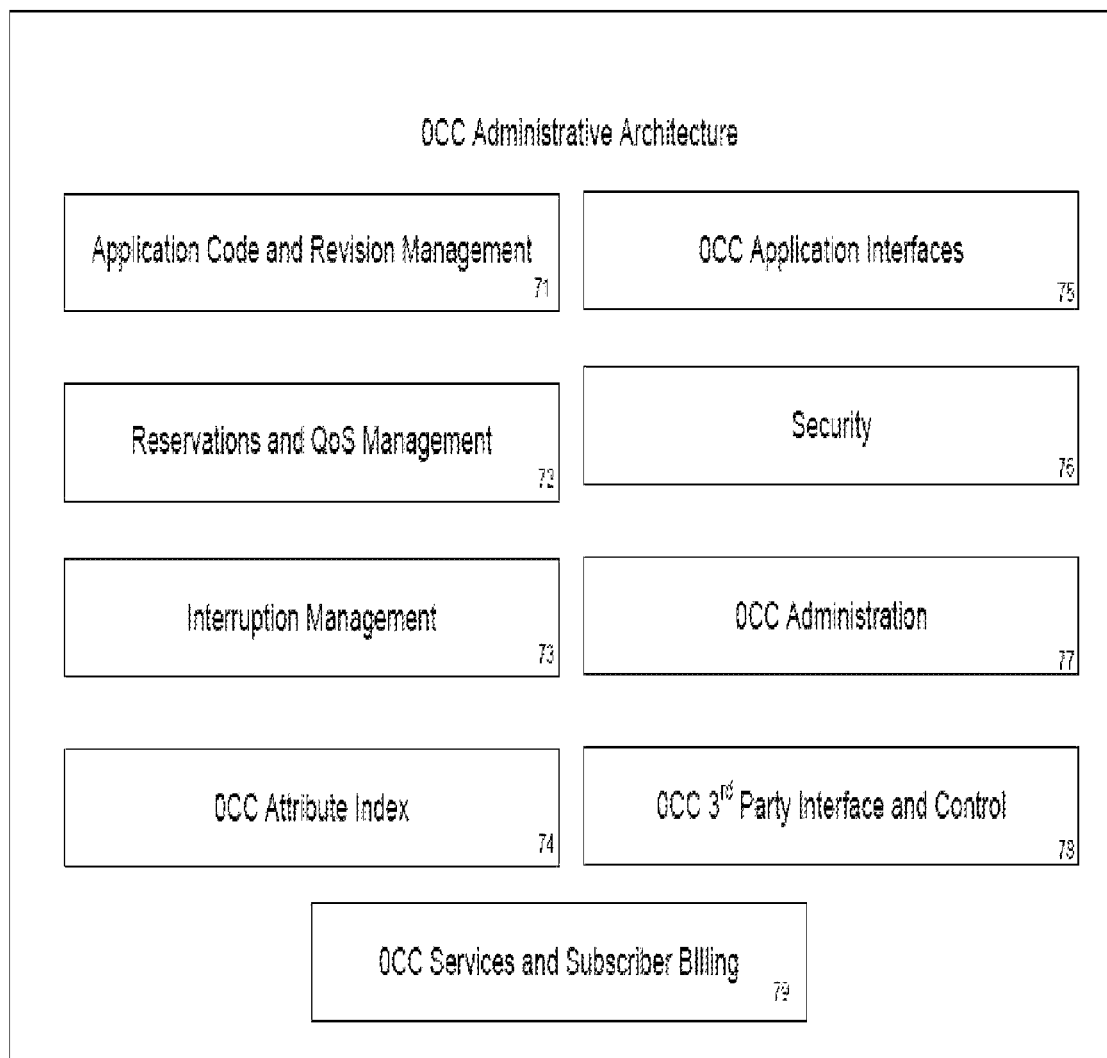
FIG. 9 is a diagram of a preferred embodiment of an administrator of zero cash cycle.

FIG. 9 is a diagram of a preferred embodiment of an administrator of 0CC. All the elements are optional, can be applied in any combination, and the administrator is not limited by the elements mentioned.

The application source code and revision management 71 is designated for a module for management of 0CC software, code revisions and/or insure subscriber code interface compatibility. Key module functions include distribution and maintenance of 0CC software to registered resources, such as with code updates, protocol revisions or patches. Software compatibilities are managed by monitoring subscriber application revisions called by 0CC functions. Optionally, diagnostic or other test routines may be created to insure ongoing functional compatibilities, or acceptable performance levels between interfacing software elements. The reservations and QOS management 72 is designated for a module responsible for the orchestration of 0CC execution across the scope of registered resources. Key module functionality extends to management of successive 0CC analytical and autonomic interpretative cycles for time indexed reference business mosaics. Management tasks include Grid resource reservation and coordination based on program requirements, accounting for data exchange, completion of jobs, data requisites, concurrent DBAM engine, or a functionally equivalent agent's, applications, Grid supervisory functions or services (either current or future specified), and prioritization of other administrative module functions. Module functionality also includes the performance monitoring of traffic or resource optimization which may be enabled by customized or third party programs currently or expected to be marketed for such use.

The interruption management 73 is designated for a module responsible for the monitoring for and reconciliation of missing data elements within an attribute parameter array, missing subscribers, or malfunction of registered resources. Key module functionality includes the assignment of temporary, arbitrary parameter array data elements for based on mathematical conditioning of prior data values from prior business mosaic time indices and later substitution of correction through conditioning with respect to values extracted from subsequent business mosaics frames. Module functionality for monitoring and reconciliation for missing subscribers includes DBAM subscriber business partner monitoring and smoothing of trend behavior across and within a group of subscriber customers. Trend behavior for a given missing attribute is accomplished by applying, in proportion to business activity representation detected as missing by way of a source or group of source attribute providers, trend behavior for like attributes quantified by subscribers present at the consumption level. Optionally, other known mathematical techniques which solve missing matrix data elements may be incorporated within the module provided that data uncertainty is maintained within a realm of practical utilization. Module monitoring for the malfunction of registered resources includes a capability to temporarily order deployment of alternate resources in the event of detected resource operating error. Optionally, commercially available resource monitoring utilities may be incorporated within the module to support its intended function.

The 0CC attribute and interpretation index 74 is designated for a module responsible for the maintaining the data archiving of attributes and their respective parameters, interpretations made from the parameters, and autonomic function results accessible for interruption management, subscriber or service provider specified exportation for secondary analysis or other permitted usage such as for additional derived autonomic business functions. The index module also records the resource location of stored data archives.

The 0CC user and application interfaces 75 is designated for a module that is responsible for managing 0CC user interface configurations. Functionality of the module includes maintenance and periodic update of user interfaces permitted or restricted for use by the DBAM engine, or a functionally equivalent agent's, administrators or clients Interfaces are defined GUI's or other interface methods available on any user or administrative hardware access platform for the purpose of viewing, managing or applying the 0CC operation. Access to and selection of interfaces would be specified based on subscriber registration or DBAM engine, or a functionally equivalent agent's, administrative permissions.

The security 76 is designated for a module that is responsible for managing the security and management of secure information transfer between 0CC specified resources and within and between proprietary or other domains. Module functionality includes the logging of session access to resources and information based on specified permission and user, as well as logging of proprietary information exported transferred to specified resources. The module provides the subscriber and the DBAM engine, or a functionally equivalent agent, with a mutual view of permissible and non-permissible access and information activity and optionally may be used by subscriber or administrator to override or cancel registered permissions. The module defers to the DBAM engine, or a functionally equivalent agent's, security module for the administration of overall DBAM engine, or a functionally equivalent agent's, intrusion, data encoding and other state of the art management methods to securely manage resources and the network supporting the DBAM engine, or a functionally equivalent agent, and 0CC.

The 0CC administration 77 is designated for a module responsible for providing administrative control over all 0CC functions. Key module functionality includes diagnostic and prioritized management of subscriber initialization and 0CC application functions, as well as 0CC modules within the administrative architecture. The module also is a slave to the DBAM engine's, or a functionally equivalent agent's, administrative module and manages coordination and priority of resources utilization requests, security, referencing indexing of data in relation to the DBAM engine's, or a functionally equivalent agent's, administrative module. Concurrent function of 0CC with addition internal DBAM engine, or a functionally equivalent agent's, applications such as BTM, PBAM, BOD or others may be within a master or slave controlled context by the 0CC administration module to the extent desired, higher level specified interactions between applications warrant certain prioritization or sequencing of computation or functions.

The OCC external third party interface and control 78 is designated for a module responsible for controlling OCC functionality with lenders or risk management services. Concurrent function of OCC with lenders or risk management service is limited to the exchange of risk profile information, including but not limited to attribute parameter data based on subscriber preference, working without QoS controls between OCC and lending or risk management operations. Optionally, the OCC administrative module may be embedded within the fabric of a third party lender or risk management service as a master or slave controller for the purpose of expanding synergy functions with the DBAM engine, or a functionally equivalent agent, such as applying QoS to control regular risk monitoring frequency, loan administration, or other germane functions.

The OCC services and subscriber billing 79 is designated for a module responsible for providing rate schedules for OCC services for subscriber confirmation during registration. The module is a slave to the DBAM engine's, or a functionally equivalent agent's, billing module for interval usage and direct subscriber billing and account consolidation, or for billing of OCC service on an account basis to a service provider for resale to a client.

Some other optional routines and m which might exist include, but are not limited to, additional software routines within each module may be incorporated to support expanded OCC administrative functionality for subscriber or service provider specified business activity attribute management applications. Other modules may be added to the OCC administrative architecture for evolution or expansion of functional performance, application-interfaces, security capability, diagnostics, or to satisfy incremental subscriber specified business capability.

Figure 10:
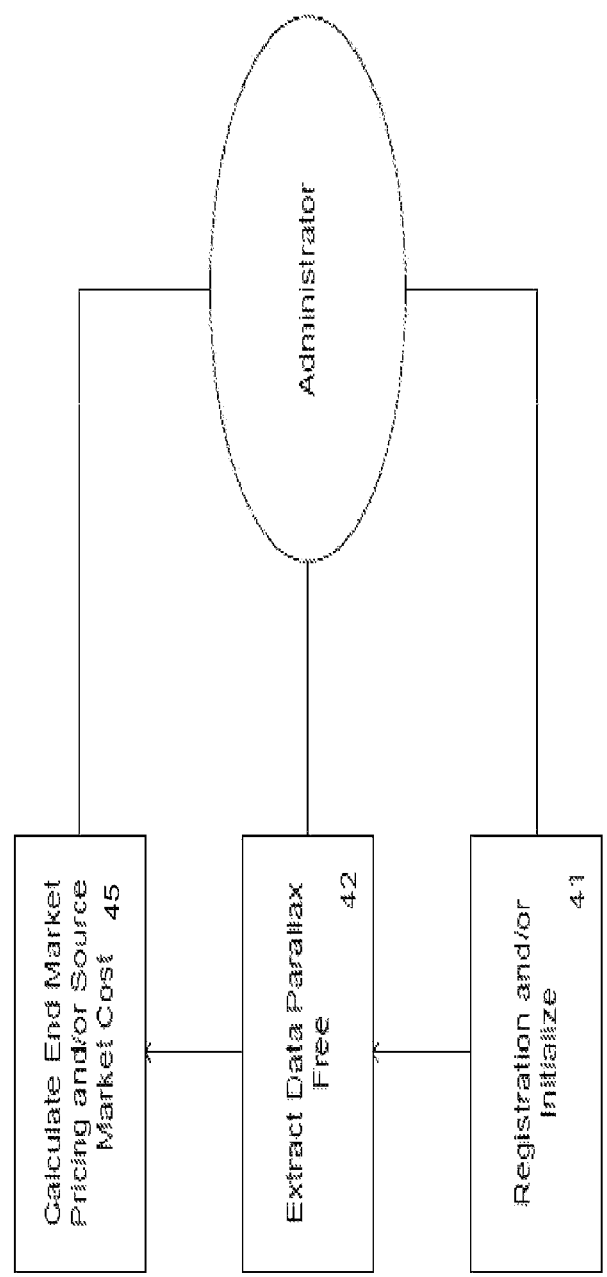
FIG. 10 is a general block diagram of a method for portfolio business activity management.

FIG. 10 is a general block diagram for a method for portfolio business activity management (PBAM). PBAM allows for coincident mapping of end market pricing and/or source market costing contained within time-indexed asset business mosaics. Its purpose includes, but is not limited to, proactively managing portfolio margin performance.

Instant advantages of PBAM include, but are not limited to: (i) Method may be used internally by to primarily derive, mandate and prioritize margin preserving forward asset supply pricing from existing partners, proactively initiate value engineering efforts where costing targets are prohibitive, or plan and execute transition strategies to higher margin portfolio products; (ii) Method may be used by Original Design Manufacturing Service Providers (as a tool) supply a revenuable portfolio management service to multiple subscribing DBAM entities.

Initially, the PBAM may require a registration and/or initialization 41 which may request, either by human or computer, any combination, but not limited by, the following: PBAM services election; PBAM resource registration and access permissions; attribute registration; PBAM interpretation preferences; and PBAM autonomic function preferences.

The PBAM services election includes, but is not limited to, the process by which an entity, by way of a user interface, alters the requisite DBAM engine's, or a functionally equivalent agent's, registration to include election of PBAM services. Service elections may include options such as: selection of autonomic function, choice of application service levels, service rates, period of subscription, scope of deployment within entity, or other related fee/non-fee service options based on subscriber preference.

The PBAM resource registration and access permissions includes, but is not limited to, the process by which an entity expands DBAM engine's, or a functionally equivalent agent's, registration to include internal entity or third party compute resource, storage, network resources, and access permissions for privacy domain operation, and administration of PBAM. One embodiment of the registered resources is depicted in FIG. 4, but others may vary with the architecture of the entity. Access to resources and permission to access certain data, run programs and distribute processed data is securely restricted within the DBAM engine, or a functionally equivalent agent, unless otherwise specified by entity. In accordance with resource registration, the DBAM engine, or a functionally equivalent agent, may require deployment of thin client software on entity resources in connection with the DBAM engine's, or a functionally equivalent agent's, host, or alternatively be completely hosted by the DBAM engine, or a functionally equivalent agent. Also in accordance with resource registration, PBAM user interfaces are configured for and accessible by entity, or users designated by entities such as contracted service providers.

The attribute registration includes, but is not limited by, the process by which an entity expands the DBAM engine's, or a functionally equivalent agent's, registration to select a list of business attributes for inclusion by autonomic application within PBAM; based upon the DBAM engine's, or a functionally equivalent agent's, attributes already registered and mapped between entities. Optionally, mapping may be expanded for authorization of some or all business attribute parameter distributions to PBAM third party service providers.

The PBAM interpretation preferences includes, but is not limited by, the process by which an entity expands the DBAM engine's, or a functionally equivalent agent's, registration for attribute interpretation. Interpretation includes any third party service relationship for the purpose of administering PBAM on behalf of a subscriber, or additional expense attribute parameter specifications, including chart of account references, grouping, or allocation schemes necessary to support the election of product, gross or operating margin profile analyses. Additionally, GUI, file transfer/distribution preferences and permissions are required to support the proprietary display of interpretative results.

The PBAM autonomic function preferences includes, but is not limited by, the process by which an entity expands the DBAM engine's, or a functionally equivalent agent's, registration to include subscriber defined threshold values or groupings for analysis of attribute parameters, in addition to linkage to other DBAM engine, or a functionally equivalent agent's, applications. These values may be used to form an intelligent rule base along with other subscriber defined performance criteria necessary for each autonomic function to provide its subscriber with logical business recommendations. Parameter threshold values associated with each attribute include, but are not limited to product, gross or operating margin performance, cumulative margin performance, return on investment and attribute lifecycle periods, advance alert intervals for adverse parameter performance, elasticity sensitivity and post-discount/incentive margin limitation with respect to margin impact. Parameter threshold values associated with each subscriber attribute include, but are not limited to gross profit, volume, or other designated subscriber account performance criteria. Additionally, subscriber attribute groupings for analysis may be specified by, but not limited to class, regional designations, or parameter type. Service provider subscriber attribute groupings for analysis may be specified by, but not limited to account, class, division, region, or other designated subscriber account grouping. Other autonomic applications may be specified by the subscriber or service provider within the DBAM engine's, or a functionally equivalent agent's, registration for operation in parallel to PBAM such as BTM, BOD, OCC or other attribute business mosaics constructed between business partners. At subscriber or service provider option, additional user defined functions such as expanded user interface, file transfer or compute steps between autonomic applications may embody the complete preference specification. GUI, file transfer/distribution preferences and permissions are required to support the proprietary display of all autonomic function preferences in use by the DBAM engine, or a functionally equivalent agent, and PBAM.

The PBAM extracts data that is data parallax free 42. The extraction may be done by where the subscriber and or service provider reference business mosaics are extracted from the same universal business mosaic at a selected frequency which is an integral multiple of the business mosaic time index. The reference business mosaics are extracted from the configured DBAM engine's, or a functionally equivalent agent's, resources and transferred to the resources so specified by the PBAM registration. A diagnostic function verifies comprehensive registered attribute representation, data element integrity, and synchronization. Incomplete or defective data may be mathematically approximated from prior frames, autonomic recalculation by agent, or otherwise resolved by administrative judgment within PBAM. Integral data is maintained within the specified privacy domain for subsequent manipulation. Data extractions are viewable by subscribers and service providers based on registered access permissions through the use of graphical user interface or other file transfer mechanism.

The PBAM calculates end market pricing and/or source market cost 43. One embodiment of calculating the end market pricing and/or source market costing includes interpretation of reference asset business mosaics and profiling, which may incorporate a process by which subscriber and service provider (source) reference business mosaics are overlaid, conditioned and interpreted to determine asset cost recovery and margin performance levels. If a subscriber has contracted portfolio management through an ODM or similar business model, PBAM overlays or superposes both references business mosaics to provide a consensus view of business activity to both parties. Overlay is achieved by translating the subscriber asset states to the service provider (or source) asset states, thereby providing an isolated view of business activity between subscriber and service provider without distortion from other subscribing customers for the same attributes. Conditioning of attribute data requires the assembly of prevailing attribute source element cost trends and reverse translation, proportionately applied from source to subscriber attribute cost trends followed by incorporation into the subscriber attribute costs. Additionally, competitive cost recoveries for end and intermediate customers are assembled for the same attribute, and applied to subscriber attribute pricing to establish a profile of market discounts. Attribute product margins profiles are conditioned from the merging of cost recovery and market discount profiles. Optionally, product margin profiles may be extended to determine gross margin profiles through incorporation of other cost of goods sold cost elements designated by subscriber as associated with each attribute. Optionally, gross margin profiles may be extended to determine attribute operating margins through incorporation of activity based expenses associated with attributes and specified within DBAM engine's, or a functionally equivalent agent's, core application performance preferences. All profile representations are viewable by subscribers and service providers based on registered access permissions through the use of graphical user interface or other file transfer mechanisms specified within core application preferences.

The following are optional, but not limiting, configurations of autonomic business functions that utilize a PBAM: PBAM autonomic portfolio management agent; PBAM autonomic portfolio services management agent; and PBAM function as an autonomic sales management agent.

A PBAM autonomic portfolio management agent may include a PBAM agent to translate margin profiles trends into asset cost recovery mandates for value engineering, cost bases for new products. Optionally, PBAM projects transition points to successor portfolio products for attributes demonstrating poor return on investment. Optionally, PBAM identifies portfolio elements that may demonstrate market elasticity and presents specific volume price relationships. Optionally, PBAM functions as an activity based product line management, providing the subscriber with the ability to profile margin performance trends between designated groups of products. The representations generated from the translation of margin trends by the autonomic agent are viewable by subscribers and service providers based on registered access permissions through the use of graphical user interface or other file transfer mechanism.

A PBAM autonomic portfolio services management agent may include a PBAM agent to provide autonomic portfolio management agent duties from the perspective of a third party service provider, such as an Original Design Manufacturer to a subscriber. PBAM concurrently maintains multiple subscriber-service reference business mosaic overlays from one another to enable PBAM and service provider to manage accounts independently and communicate management performance of attribute parameters to customers. Optionally, the PBAM agent may combine certain subscriber source attribute elements together along with internal attributes, such as overhead expense, development expense, for the purpose of profiling customer margin and assignment of sales price rate scales based on subscriber business activity. The representations of services generated by the autonomic agent are viewable by subscribers and service providers based on registered access permissions through the use of graphical user interface or other file transfer mechanism.

A PBAM function as an autonomic sales management agent may include a PBAM agent to examine attribute elasticity by evaluation of attribute sales variability with respect to changes in sales price, and impact on cumulative margins for that attribute. Based on registration preference, PBAM may determine promotional discounts, special sales incentives options, or other specified sales intelligence derivable from the participating attribute parameters to effectively manage sales by portfolio element, segment or sales region, or other permutation possible by manipulating registered attribute parameters. The representations of services generated by the autonomic agent are viewable by based on registered access permissions through the use of graphical user interface or other file transfer mechanism.

Optionally, PBAM may couple portfolio management functions with other non-DBAM engine, or a functionally equivalent agent's, attribute evaluation schemes of synchronous or asynchronous business activity representations between related business partners. PBAM may alternatively be coupled to operate with other DBAM applications such as BTM, BOD or OCC in the context of a service provider offering or value add service, or to compound autonomic synergies for an individual subscribers.

Figure 11:
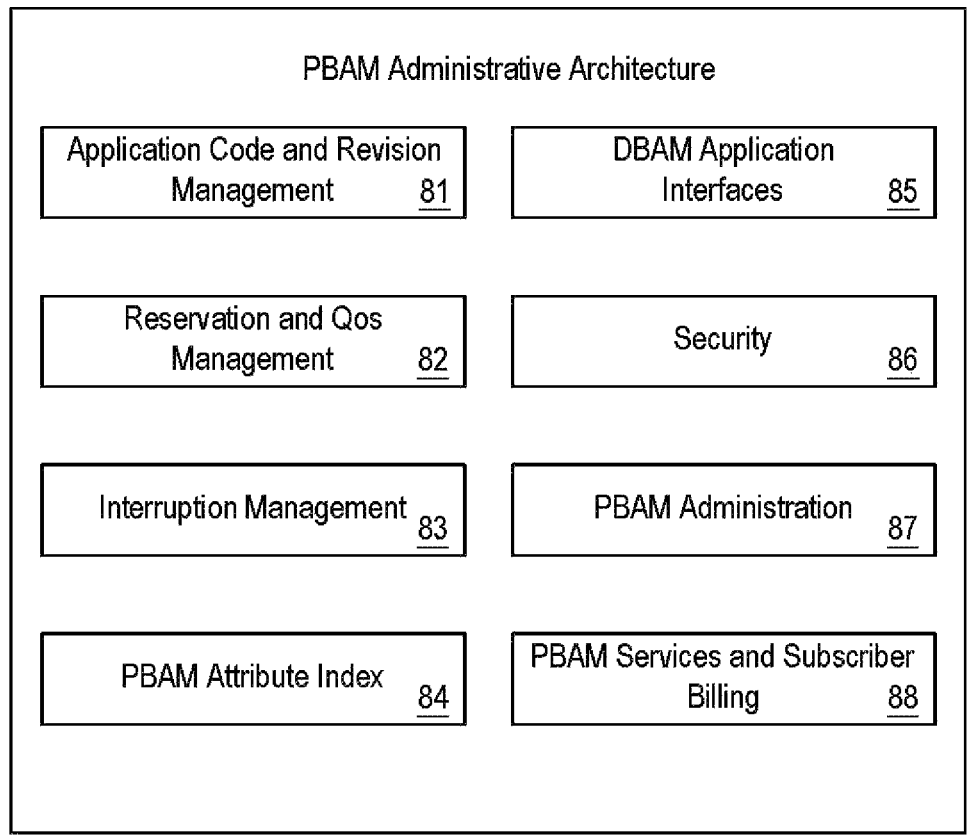
FIG. 11 is a diagram of a preferred embodiment of an administrator of portfolio business activity management.

FIG. 11 is a diagram of a preferred embodiment of an administrator of PBAM. All the elements are optional, can be applied in any combination, and the administrator is not limited by the elements mentioned.

The application source code and revision management 81 is designated for a module responsible to manage PBAM software, code revisions and insure subscriber code interface compatibility. Key module functions include distribution and maintenance of PBAM software to registered resources, such as with code updates, protocol revisions or patches. Software compatibilities are managed by monitoring subscriber application revisions called by PBAM functions. Optionally, diagnostic or other test routines may be created to insure ongoing functional compatibilities, or acceptable performance levels between interfacing software elements.

The reservations and QOS management 82 is designated for a module responsible for the orchestration of PBAM execution across the scope of registered resources. Key module functionality extends to management of successive PBAM analytical and autonomic interpretative cycles for time indexed reference business mosaics. Management tasks include Grid resource reservation and coordination based on program requirements, accounting for data exchange, completion of jobs, data requisites, concurrent DBAM engine, or functionally equivalent agent's, applications, Grid supervisory functions or services (either current or future specified), and prioritization of other administrative module functions. Module functionality also includes the performance monitoring of traffic or resource optimization which may be enabled by customized or third party programs currently or expected to be marketed for such use.

The interruption management 83 is designated for a module responsible for the monitoring and/or reconciliation of missing data elements within an attribute parameter array, missing subscribers, or malfunction of registered resources. Key module functionality includes the assignment of temporary, arbitrary parameter array data elements for based on mathematical conditioning of prior data values from prior business mosaic time indices and later substitution of correction through conditioning with respect to values extracted from subsequent business mosaics frames. Module functionality for monitoring and reconciliation for missing subscribers includes DBAM engine, or functionally equivalent agent, subscriber business partner monitoring and smoothing of trend behavior across and within a group of subscriber customers. Trend behavior for a given missing attribute is accomplished by applying, in proportion to business activity representation detected as missing by way of a source or group of source attribute providers, trend behavior for like attributes quantified by subscribers present at the consumption level. Optionally, other known mathematical techniques which solve missing matrix data elements may be incorporated within the module provided that data uncertainty is maintained within a realm of practical utilization. Module monitoring for the malfunction of registered resources includes a capability to temporarily order deployment of alternate resources in the event of detected resource operating error. Optionally, commercially available resource monitoring utilities may be incorporated within the module to support its intended function.

The PBAM attribute and interpretation index 84 is designated for a module responsible for the maintaining the data archiving of attributes and their respective parameters, interpretations made from the parameters, and autonomic function results accessible for interruption management, subscriber or service provider specified exportation for secondary analysis or other permitted usage such as for additional derived autonomic business functions. The index module also records the resource location of stored data archives.

The PBAM user and application interfaces 85 is designated for a module that is responsible for managing PBAM user interface configurations. Functionality of the module includes maintenance and periodic update of user interfaces permitted or restricted for use by the DBAM engine's, or functionally equivalent agent's, administrators or clients. Interfaces are defined GUI's or other interface methods available on any user or administrative hardware access platform for the purpose of viewing, managing or applying the PBAM operation. Access to and selection of interfaces would be specified based on subscriber registration or the DBAM engine's, or functionally equivalent agent's, administrative permissions.

The security 86 is designated for a module that is responsible for managing the security and management of secure information transfer between PBAM specified resources and within and between proprietary or other domains. Module functionality includes the logging of session access to resources and information based on specified permission and user, as well as logging of proprietary information exported transferred to specified resources. The module provides the subscriber and the DBAM engine, or functionally equivalent agent, with a mutual view of permissible and non-permissible access and information activity and optionally may be used by subscriber or administrator to override or cancel registered permissions. The module defers to the DBAM engine's, or functionally equivalent agent's, security module for the administration of overall the DBAM engine's, or functionally equivalent agent's, intrusion, data encoding and/or other state of the art management methods to securely manage resources and the network supporting the DBAM engine, or functionally equivalent agent, and PBAM.

The PBAM administration 87 is designated for a module responsible for providing administrative control over all PBAM functions. Key module functionality includes diagnostic and prioritized management of subscriber initialization and PBAM application functions, as well as PBAM modules within the administrative architecture. The module also is a slave to the DBAM engine's, or functionally equivalent agent's, administrative module and manages coordination and priority of resources utilization requests, security, referencing indexing of data in relation to the DBAM engine's, or functionally equivalent agent's, administrative module. Concurrent function of PBAM with addition applications such as 0CC, BTM, BOD or others may be within a master or slave controlled context by the PBAM administration module to the extent desired, higher level specified interactions between applications warrant certain prioritization or sequencing of computation or functions.

The PBAM services and subscriber billing 88 is designated for a module responsible for providing rate schedules for PBAM services for subscriber confirmation during registration. The module is a slave to the DBAM engine's, or functionally equivalent agent's, billing module for interval usage and direct subscriber billing and account consolidation, or for billing of PBAM service on an account basis to a service provider for resale to a client.

Some other optional routines and modules which might exist include, but are not limited to, additional software routines within each module may be incorporated to support expanded PBAM administrative functionality for subscriber or service provider specified business activity attribute management applications. Other modules may be added to the PBAM administrative architecture for evolution or expansion of functional performance, application interfaces, security capability, diagnostics, or to satisfy incremental subscriber specified business capability.

Figure 12:
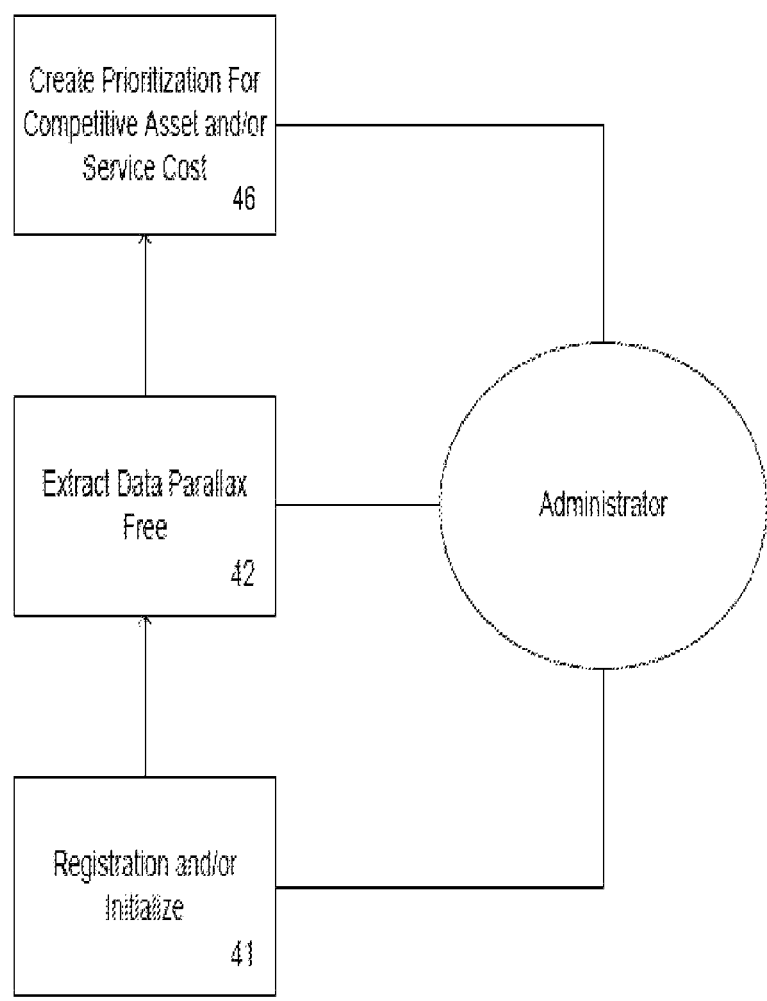
FIG. 12 is a general block diagram of a method for bid to market.

FIG. 12 is a general block diagram for a method for bid to market (BTM). BTM allows a business to prioritize management of competitive asset or service cost recovery.

Instant advantages of BTM include, but are not limited to: (i) Method may be utilized by entities contract purchasing providers to assure customers of best price performance in connection with end market pricing pressures; (ii) Method may be utilized by contract purchasing providers to autonomously manage A, B, or C class voluminous cost management activity at low levels of interactive overhead; (iii) Method may be combined with commercial exchange (including reverse exchange) service providers to render a fully autonomic market driven procurement solution; (iv) Method may be utilized in connection with an exchange and OCC derived financing solutions for purchase transactions based pre-approved buyer credit.

Initially, the BTM may require a registration and/or initialization 41 which may request, either by human or computer, any combination, but is not limited by, the following: BTM services election; BTM resource registration and access permissions; attribute registration; BTM core application performances preferences; and BTM autonomic function preferences.

The BTM services election includes, but is not limited to, the process by which an entity alters the requisite the DBAM engine's, or a functionally equivalent agent's, registration to include election of BTM services. Service elections may include options such as: selection of autonomic function, choice of application service levels, service rates, period of subscription, scope of deployment within entity, or other related fee/non fee service options based on subscriber preference.

The BTM resource registration and access permissions includes, but is not limited to, the process by which an entity expands the DBAM engine's, or a functionally equivalent agent's, registration to include internal entity or third party compute resource, storage, network resources, and access permissions for operation, and administration of BTM. Access to resources and permission to access data, run programs and distribute processed data is securely restricted within the DBAM engine, or a functionally equivalent agent, unless otherwise specified by entity. In accordance with resource registration, the DBAM engine, or a functionally equivalent agent, may require deployment of thin client software on entity resources in connection with the DBAM engine's, or a functionally equivalent agent's, host, or alternatively be completely hosted by the DBAM engine, or a functionally equivalent agent. Also in accordance with resource registration, BTM user interfaces are configured for and accessible by entity, or users designated by entities such as contracted service providers.

The attribute registration includes, but is not limited to, the process by which an entity expands the DBAM engine's, or a functionally equivalent agent's, registration to select a list of business attributes for inclusion by autonomic application within BTM, based upon the DBAM engine's, or a functionally equivalent agent's, attributes already registered and mapped between entities. Optionally, mapping may be expanded for authorization of some or all business attribute parameter distributions to BTM third party service providers.

The BTM core application performance preferences includes, but is not limited to, the process by which an entity expands the DBAM engine's, or a functionally equivalent agent's, registration for attribute interpretation. Interpretation of attributes requires verification of the most aggressive, but market linked cost recovery, compliance with a prioritization scheme that focuses cost recovery action to produce that greatest impact to the subscribing entity, and pursuit of alternate sourcing strategies. Verification of the most aggressive market reflected behavior can be achieved through the specified utilization of DBAM registration of like asset attributes, or optionally, through the subscription to outside market commodity pricing trend or general market trend data service for comparison to like asset attribute parameters. Cost recovery prioritization is achieved based on specification of asset attribute rank order criteria including attribute grouping or contributive margin thresholds. Enabling alternate sourcing strategies require the specification of a request for quote format, including attribute parameter elements such as functional specification, volume, and phase-in date or other registered specifications required for purchase. Additionally, GUI, file transfer/distribution preferences and permissions may be required to support the proprietary display of interpretative results.

The BTM autonomic function preferences includes, but is not limited to, the process by which an entity expands the DBAM engine's, or a functionally equivalent agent's, registration to include subscriber defined threshold values or groupings for analysis of attribute parameters, incorporation of intelligence yielding subroutines, or linkages with other DBAM engine, or a functionally equivalent agent's, or external applications. Threshold values and groupings specified for the analysis of attribute parameters related to cost recovery may include, but not be limited by solicitation bid response latitudes by source, repetitive solicitation response limits by source, reverse auction bid selection latitudes, and asset devaluation thresholds for dispatch to auctions for disposal. Subroutines defined within BTM registration may include intelligent rule bases used to narrow and present reverse-auction bid results, or importation of a user defined rule based for such application. Linkages to other DBAM engine, or a functionally equivalent agent, applications or external applications may include, but are not limited to: PBAM as a slave to support a third party service such as "best price assurance," BOD as a slave to provide autonomic procurement support, with OCC as a master to initiate financing solutions for purchased attributes, or with external reverse or conventional auction sites as masters and slaves, to initiate bid sessions, but to respond to exchange session results. Additionally, GUI, file transfer/distribution preferences and permissions are required to support the proprietary display of all autonomic function preferences in use by the DBAM engine, or a functionally equivalent agent, and BTM.

The BTM extracts data that is data parallax free 42. The extraction may be done by where the subscriber reference business mosaic is extracted from a universal business mosaic at a selected frequency which is an integral multiple of the business mosaic time index. The reference business mosaic is extracted from the configured DBAM engine's, or a functionally equivalent agent's, resources and transferred to the resources so specified by the BTM registration. A diagnostic function verifies comprehensive registered attribute representation, data element integrity, and synchronization. Incomplete or defective data may be mathematically approximated from prior frames, autonomic recalculation by agent, or otherwise resolved by administrative judgment within BTM. Integral data is maintained within the specified privacy domain for subsequent manipulation.

The BTM creates a prioritization for competitive asset and/or service cost 43. One embodiment of creating the prioritization includes interpreting a reference asset business mosaic and profiling which may be accomplished by a process by which subscriber reference business mosaics are conditioned and/or by determining attribute market valuations and/or interpret and/or prioritize asset cost recovery levels.

Intermediate and end market valuations are represented within the business mosaic as series of translated discounts (from a chosen entity asset reference price) integrated at each entity resale interval through to the end market and correspondingly applied to the reference entity's specific sale asset price. Interpreted cost recoveries represent the maximum market value deterioration discovered for a specified entity asset in any incorporated state following its sale from the source entity. Final determination of cost recoveries requires the translation, integration and application of the host asset discounts to source asset elements. Cost recoveries may be further refined by comparison to market subscription services specified within the BTM registration for spot market costs, or from within the universal business activity mosaic for like asset classes at either entity or source level. Prioritization of finalized cost recoveries for assets provided by a single source is determined on the basis of cumulative impact which may be based exclusively on volume or other entity preference. In addition to prioritized source asset element cost recoveries, attributes such as specification, order status, inventory status, approved sources included within the reference business mosaic are assembled into a entity preference defined format, or request for quotation format for use in distribution.

The following are optional, but not limiting, configurations of autonomic business functions that utilize a BTM: autonomic agent for cost recovery solicitation; autonomic agent for reverse-auction exchange and bid impact presentation; and autonomic lead generator and feed for exchange brokerage services.

An autonomic agent for cost recovery solicitation may include a BTM agent to provide autonomic functions for cost recovery solicitation from existing sources. Market cost solicitation is accomplished through the distribution of all relevant requests for quotation to the asset element source, soliciting a response to the cost recovery priorities. The BTM engine provides prompting and response management functions along with analysis and presentation of sources responses based on user preferences such as acceptance or repetitive request limits, or others. The BTM Engine updates asset log attributes responses meeting or exceeding cost recovery thresholds, and isolates responses above both target and or spot market levels, as defined by preference, for disposition by entity. The BTM engine supports the cost recovery solicitation of all assets registered within the reference asset business mosaic.

An autonomic agent for reverse-auction exchange and bid impact presentation may include a BTM agent to provide autonomic functions for submission of target cost levels based on asset recoveries for elemental asset to reverse auction venues for new source election. Based on entity registered preferences, the BTM administers the selection, response and interpretations of requested asset cost recoveries included within requests for quotation submitted to reverse-auction venues.

An autonomic lead generator and feed for exchange brokerage services may include a BTM agent to provide autonomic functions for the submission of assets selected based on devaluation preference to auction venues for disposal sale. Based on target cost levels to conventional entity preference, the BTM administers the selection, response and interpretations of asset deposal sales responses from auction venues.

Figure 13:
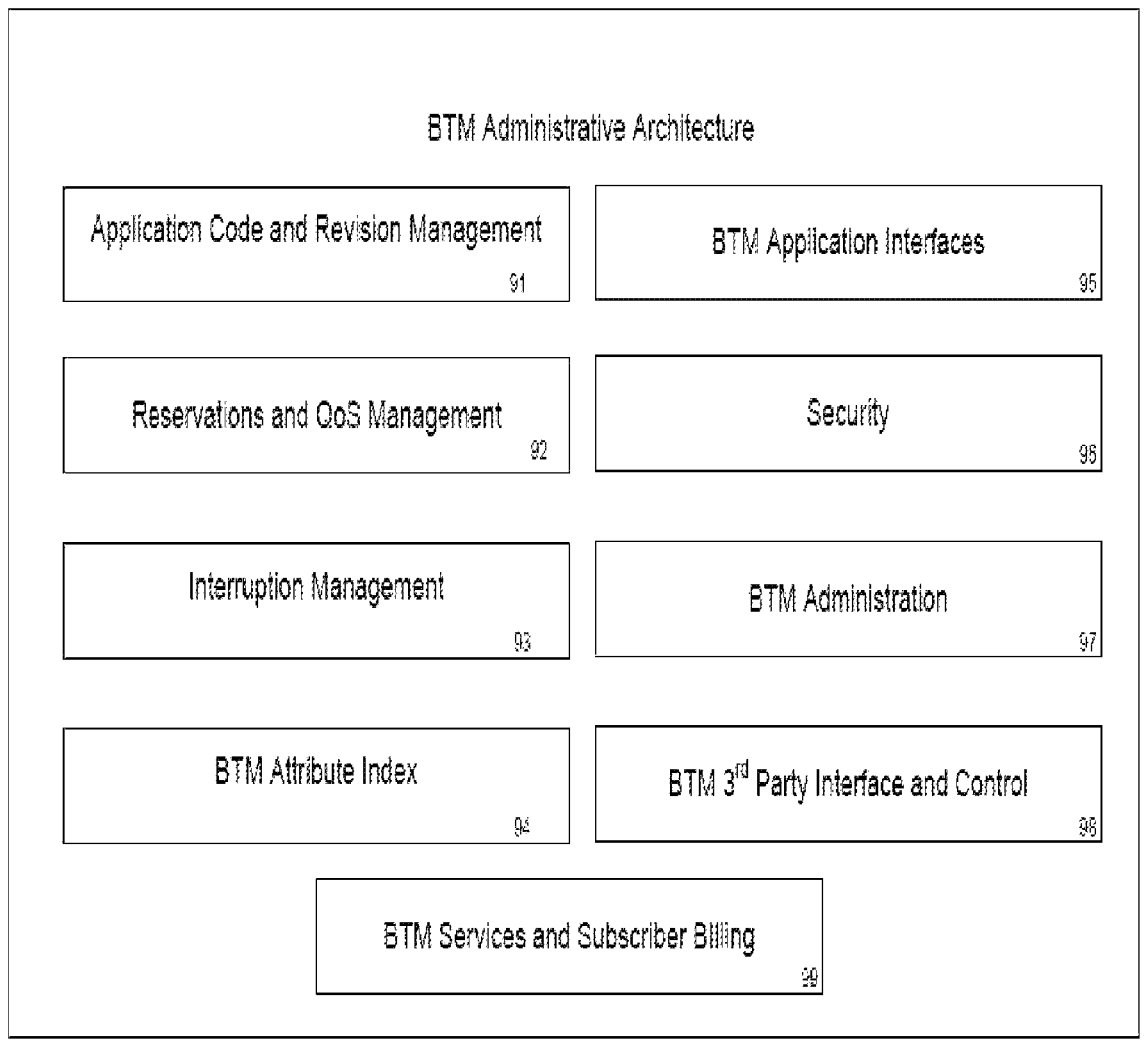
FIG. 13 is a diagram of a preferred embodiment of an administrator of bid to market.

FIG. 13 is a diagram of a preferred embodiment of an administrator of BTM. All the elements are optional, can be applied in any combination, and the administrator is not limited by the elements mentioned.

The application source code and revision management 91 is designated for a module responsible for managing BTM software, code revisions and insure subscriber code interface compatibility. Key module functions include distribution and maintenance of BTM software to registered resources, such as with code updates, protocol revisions or patches. Software compatibilities are managed by monitoring subscriber application revisions called by BTM functions. Optionally, diagnostic or other test routines may be created to insure ongoing functional compatibilities, or acceptable performance levels between interfacing software elements.

The reservations and QOS management 92 is designated for a module responsible for the orchestration of BTM execution across the scope of registered resources. Key module functionality extends to management of successive BTM analytical and autonomic interpretative cycles for time indexed reference business mosaics. Management tasks include Grid resource reservation and coordination based on program requirements, accounting for data exchange, completion of jobs, data requisites, concurrent DBAM engine, or functionally equivalent agent, applications, Grid supervisory functions or services (either current or future specified), and prioritization of other administrative module functions. Module functionality also includes the performance monitoring of traffic or resource optimization which may be enabled by customized or third party programs currently or expected to be marketed for such use.

The interruption management 93 is designated for a module responsible for the monitoring and reconciliation of missing data elements within an attribute parameter array, missing subscribers, or malfunction of registered resources. Key module functionality includes the assignment of temporary, arbitrary parameter array data elements for based on mathematical conditioning of prior data values from prior business mosaic time indices and later substitution of correction through conditioning with respect to values extracted from subsequent business mosaics frames. Module functionality for monitoring and reconciliation for missing subscribers includes the DBAM engine's, or functionally equivalent agent's, subscriber business partner monitoring and smoothing of trend behavior across and within a group of subscriber customers. Trend behavior for a given missing attribute is accomplished by applying, in proportion to business activity representation detected as missing by way of a source or group of source attribute providers, trend behavior for like attributes quantified by subscribers present at the consumption level. Optionally, other known mathematical techniques which solve missing matrix data elements may be incorporated within the module provided that data uncertainty is maintained within a realm of practical utilization. Module monitoring for the malfunction of registered resources includes a capability to temporarily order deployment of alternate resources in the event of detected resource operating error. Optionally, commercially available resource monitoring utilities may be incorporated within the module to support its intended function.

The BTM attribute and interpretation index 94 is designated for a module responsible for the maintaining the data archiving of attributes and their respective parameters, interpretations made from the parameters, and autonomic function results accessible for interruption management, subscriber or service provider specified exportation for secondary analysis or other permitted usage such as for additional derived autonomic business functions. The index module also records the resource location of stored data archives.

The BTM user and application interfaces 95 is designated for a module that is responsible for managing BTM user interface configurations. Functionality of the module includes maintenance arid periodic update of user interfaces permitted or restricted for use by the DBAM engine's, or functionally equivalent agent's, administrators or clients. Interfaces are defined GUI's or other interface methods available on any user or administrative hardware access platform for the purpose of viewing, managing or applying the BTM operation. Access to and selection of interfaces would be specified based on subscriber registration or the DBAM engine's, or functionally equivalent agent's, administrative permissions.

The security 96 is designated for a module that is responsible for managing the security and management of secure information transfer between BTM specified resources and within and between proprietary or other domains. Module functionality includes the logging of session access to resources and information based on specified permission and user, as well as logging of proprietary information exported transferred to specified resources. The module provides the subscriber and the DBAM engine, or functionally equivalent agent, with a mutual view of permissible and non-permissible access and information activity and optionally may be used by subscriber or administrator to override or cancel registered permissions. The module defers to the DBAM security module for the administration of overall the DBAM engine's, or functionally equivalent agent's, intrusion, data encoding and other state of the art management methods to securely manage resources and the network supporting the DBAM engine, or functionally equivalent agent, and BTM.

The BTM administration 97 is designated for a module responsible for providing administrative control over all BTM functions. Key module functionality includes diagnostic and prioritized management of subscriber initialization and BTM application functions, as well as BTM modules within the administrative architecture. The module also is a slave to the DBAM engine's, or functionally equivalent agent's, administrative module and manages coordination and priority of resources utilization requests, security, referencing indexing of data in relation to the DBAM engine's, or functionally equivalent agent's, administrative module. Concurrent function of BTM with addition internal DBAM engine, or functionally equivalent agent, applications such as OCC, PBAM, BOD or others may be within a master or slave controlled context by the BTM administration module to the extent desired, higher level specified interactions between applications warrant certain prioritization or sequencing of computation or functions.

The BTM external third party interface and control 98 is designated for a module responsible for controlling BTM functionality with third party exchange service providers. Concurrent function of BTM with third party reverse or conventional bid for goods exchanges is limited to the exchange of bid session initiation and response information, including but not limited to attribute parameter data working without QoS controls between BTM and exchange activity. Optionally, this BTM administrative module may be embedded within the fabric of a third party exchange as a master or slave controller for the purpose of expanding synergy functions such as purchase volume forecasting, deriving group procurement benefits opportunities based upon known buyer interest, applying QoS control to overall quotation and bid session performance, or other relevant capabilities.

The BTM services and subscriber billing 99 is designated for a module responsible for providing rate schedules for BTM services for subscriber confirmation during registration. The module is a slave to the DBAM engine's, or functionally equivalent agent's, billing module for interval usage and direct subscriber billing and account consolidation, or for billing of BTM service on an account basis to a service provider for resale to a client.

Some other optional routines and modules which may exist include, but are not limited to, additional software routines within each module may be incorporated to support expanded BTM administrative functionality for subscriber or service provider specified business activity attribute management applications. Other modules may be added to the BTM administrative architecture for evolution or expansion of functional performance, application interfaces, security capability, diagnostics, or to satisfy incremental subscriber specified business capability.

Figure 14:
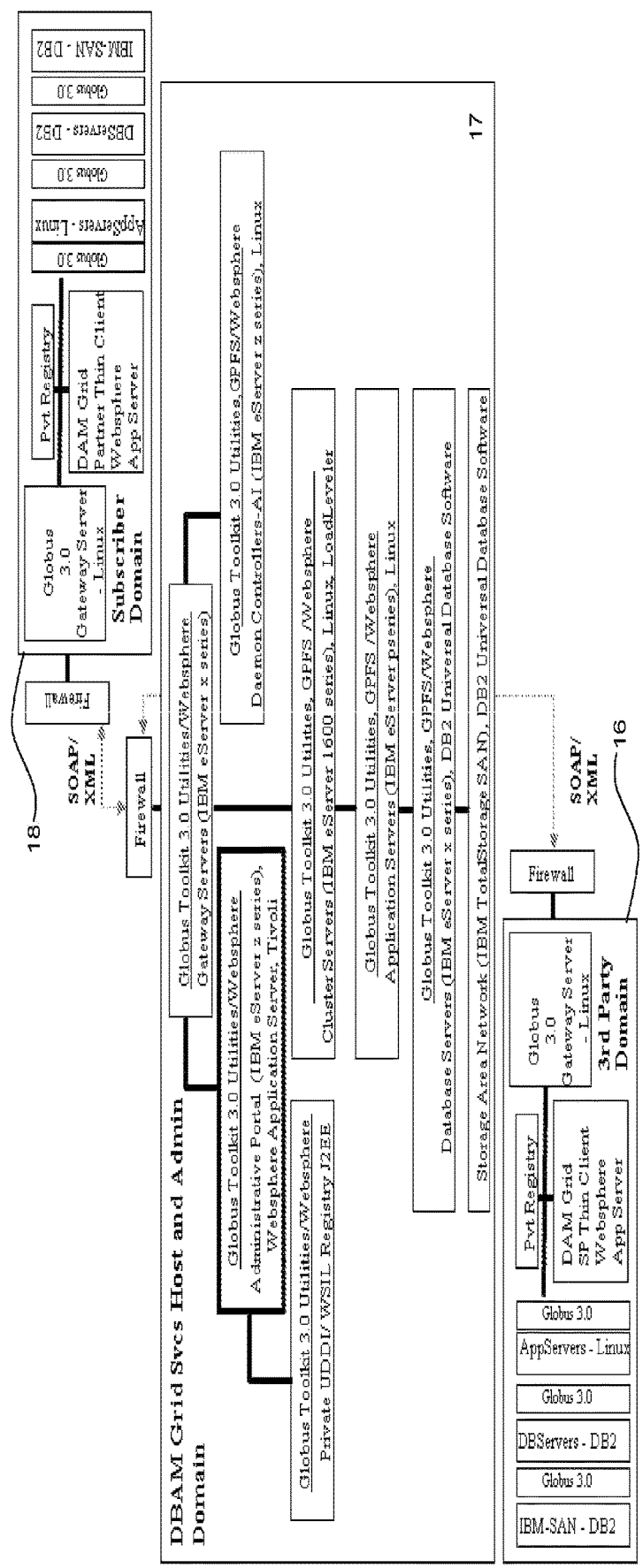
FIG. 14 is a diagram of a preferred embodiment of the hardware and software configuration for the DBAM engine.

FIG. 14 is a diagram of a preferred embodiment of the hardware and software configuration for the DBAM engine. It is not meant to be limiting in anyway.

A functioning Discrete Business Activity Management engine network and compute platform incorporates three types of major compute and network domains: (i) the DBAM domain 11, (ii) the subscriber domain 12 and (iii) a third party domain 10.

Each domain may typically comprises of an array of gateway, administrative, application, daemon, database, cluster or other types of servers linked to storage networks and other enterprise intranet and extranet topographical components such as firewalls. The DBAM domain controls the function of all DBAM and DBAM application required data extractions, manipulations and exchange of processed information within and between all domains with access and data exchange permissions explicitly authorized by all domains, and managed at repeatable quality of service levels for all interoperating components. The subscriber domain independently manages the information systems environment for a given subscribing enterprise. The environment, in addition to the hardware topography mentioned, includes mission critical enterprise software applications such as an SAP ERP, Siebel CRM, Oracle Financials, DB2 mounted on application, database, or cluster servers. These software applications represent the requisite data source and compute resource elements within the subscriber necessary to effectively function with the DBAM domain, and must be explicitly configured (with access permissions and file or data element export permissions) and be resource prioritized to react to function calls from the DBAM domain. Optionally, additional critical enterprise applications, provided by third party application service providers may be included within the subscriber domain, but must also function with access permissions, data confidentiality submit to resource prioritization by the DBAM domain. The third party domain, defined but not limited to service providers incorporating and embedding DBAM services within custom value add services of their own, may maintain independent or partial control over the information systems environment of the provider depending on how the DBAM domain interface is defined. The environment, in addition to the hardware topography and mission critical software applications mentioned, may embody standard or custom software applications which provide the support platform for various value add services sold to subscribers. The DBAM service provider domain interface may require significant handshaking between DBAM and service provider software depending on the level of proprietary subscriber information or reliance on DBAM processing capability. In these cases, DBAM may require service provider domain access permissions and resource priority control. Where service provider applications are independent and do not require a quality of service level from interoperating systems, DBAM may exert no control over the third party domain and may simply function to exchange information asynchronously.

In the preferred embodiment, Grid Technologies and the Globus Toolkit (version 3.0 or later) would be used to enable all three functional domain hardware and software platforms for DBAM and application functions to be comprehensively deployed across existing dissimilar hardware and software platforms for centralized DBAM control of critical access, proprietary information management and quality of service considerations.

Figure 15:
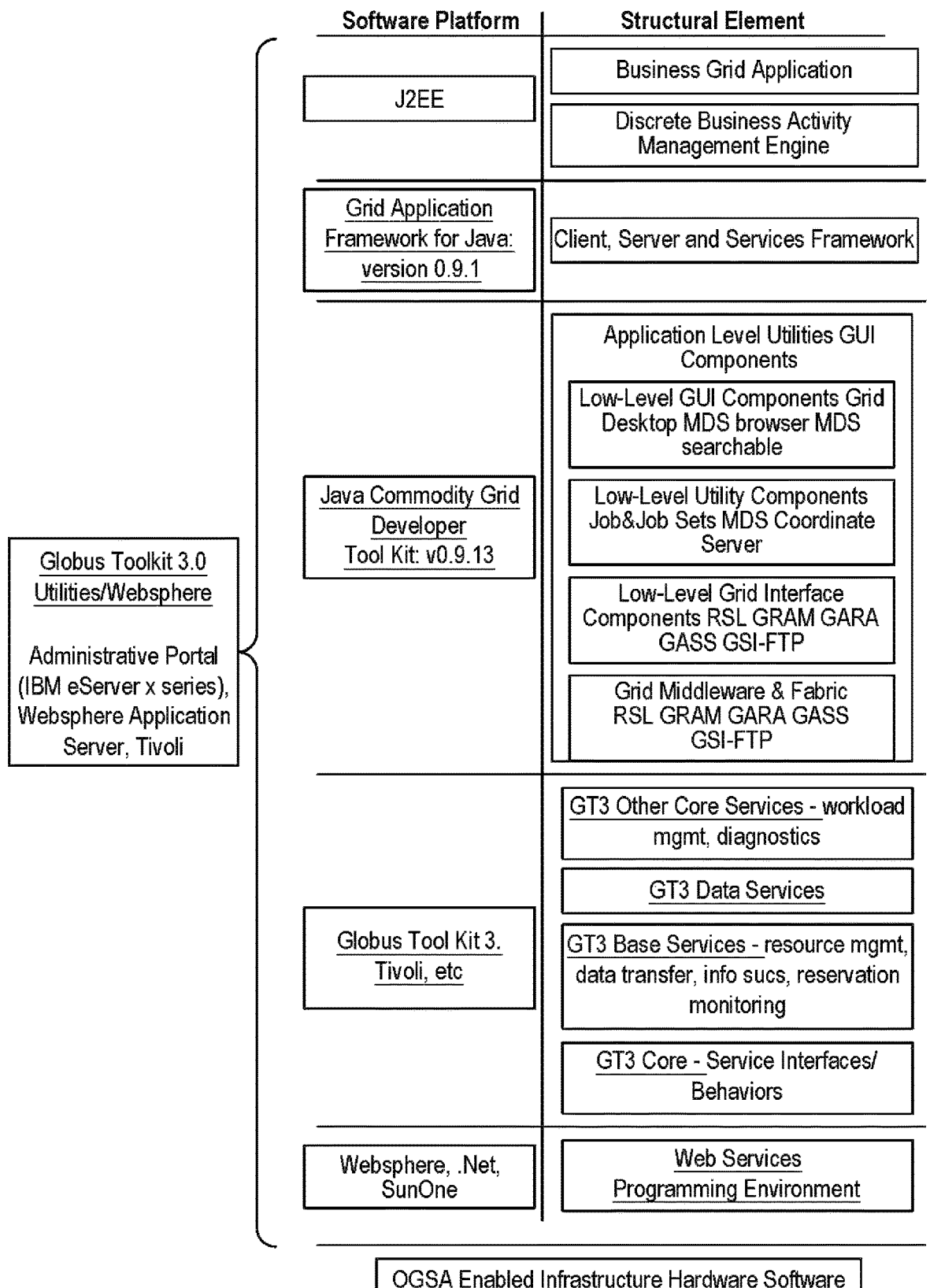
FIG. 15 is a diagram of a preferred embodiment of the DBAM engine application and software architecture.

FIG. 15 is a diagram of a preferred embodiment of the DBAM engine application and software architecture. It is not meant to be limiting in anyway.

DBAM Engine and application software functionality is realized on the basis of a series of interoperating layers of software beginning with resident hardware specific application software and observe DBAM QoS, synchronization, security and access mandates. In the preferred embodiment of DBAM, Grid Technologies supporting the Globus Toolkit (3.0 or later release), the Java Commodity Grid Toolkit (version compatible with Globus Toolkit 3.0 or later release), the Grid Application Framework for Java, and J2EE are software elements used to construct and deploy the DBAM application. Within the preferred embodiment at the infrastructure layer, hardware specific application software, such as for IBM series z eservers is Globus Toolkit (3.0 or better) enabled, meaning the software is configured to recognize Grid services associated with standard resource reservation, access, instantiation or other custom Grid services functions. Hardware enabled with Grid capability may be registered with the DBAM engine for utilization within the DBAM and DBAM application operations. At the web services or business application integration layer, core or base Grid services, including but not limited to, functions for resource management, workload management, reservations monitoring, data management are incorporated from the Globus Toolkit (3.0 or later release) and coexist with Websphere or SunOne environments to manage data manipulation tasks within mission critical enterprise applications. More complex, high level custom Grid services used to support DBAM and DBAM applications through the manipulation of standard, core, or custom core Grid services are developed based on the Java Commodity Grid Toolkit (version compatible with Globus Toolkit 3.0 or later).

Optionally, above the services layer, DBAM may of a layer of software which serves to abstract grid infrastructure interfacing functions from the application layer (above). The Grid Application Framework for Java (version compatible with Globus Toolkit 3.0 or later) is utilized to construct this software layer. Above the services or Grid abstraction layers, the DBAM and DBAM applications are developed based on J2EE.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks including but not limited to portable or handheld wireless communications and/or computing and storage devices, and that networks may be wired, wireless, or a combination of wired and wireless. Other variations and embodiments are possible in light of above teachings, and it is thus intended that the scope of invention not be limited by this Detailed Description, but rather by Claims following.

Glossary

As used herein the GRID and GRID Architecture contain protocols that have been incorporated into to what is known today as the Web Services-Management Standard (https://en.wikipedia.org/wiki/WS-Management) [2019 0923], which defines an overall Web Services-based Architecture for the management of hardware, data and invocation of web services across a distributed (Cloud) architecture, (e.g. Amazon AWS).

"Cloud computing" in Wikipedia; [en.wikipedia.org/wiki/Cloud computing][2019 0924: Cloud computing is the on-demand availability of computer system resources, especially data storage and computing power, without direct active management by the user. The term is generally used to describe data centers available to many users over the Internet. Large clouds, predominant today, often have functions distributed over multiple locations from central servers. If the connection to the user is relatively close, it may be designated an edge server. Clouds may be limited to a single organization (enterprise clouds [1][2]), or be available to many organizations (public cloud). Cloud computing relies on sharing of resources to achieve coherence and economies of scale.

As used herein Front End Platform refers to thin/thick clients (desktop as wired/wireless), or a handheld wireless communication+compute/storage device (smart phone), essential components of a compatible Cloud/DBAM Architecture definition.

As used herein Back End Platform refers to essential components of compute, storage and other administrative platforms, essential components of a compatible Cloud/DBAM Architecture definition.

As used herein Delivery as a Service refers to the configuration of the DBAM as a service, accessible and delivered through a third party service infrastructure. "Delivery as a service" is one or more embodiments of the Instant Invention wherein a form of the invention (apparatus) is described to include further aspects of registration to third party service providers of the DBAM function: "resource and/or access permissions registration includes, but is not limited to registration within a subscribing enterprise's own and/or via third party compute resource, storage or network service providers, or other network and/or information processing resources which may support attribute parameter routing, the assignment of access permissions, location of thin clients, and the administration of the DBAM engine."

As used herein the term Network includes the configuration of the DBAM within the context of a network. An embodiment of the Invention is disclosed wherein a form of the invention (apparatus) is defined as functional within a network "compute and network resources which support the sharing and coordinated use of diverse resources in dynamic, virtual organizations, created from geographically distributed components operated by distinct organizations with differing policies, of virtual computing systems that are sufficiently integrated to deliver the desired quality of service."

What is claimed is:

1. A system for processing discrete business activity management (DBAM) commands that continuously manage attribute data spanning across partner business networked domains, the system comprising:
   a DBAM processing node;
   a plurality of networked domains;
   a Web Service Network; and
   one or more computer systems comprising a plurality of nodes, one or more processors, and one or more storage devices, the one or more computer systems communicatively coupled with the DBAM processing node, the plurality of network domains, and the Web Service Network;
   wherein the Web Service Network is configured by a stateful and/or a stateless, method;
   wherein under the direction of the DBAM commands from the DBAM processing node, each of the plurality of networked domains are configured to translate transient attribute data from a first domain of the plurality of networked domains to a second domain or the plurality of networked domains; and
   wherein each Web Service Network node is harmonized by assembling a harmonized attribute data between each node of the plurality of nodes in near real time or real time to establish a collective state between the nodes of the plurality of nodes, and by translating the harmonized attribute data back to a context of each Web Service Network node, by reversing to the context of each registered node reference.

2. The system according to claim 1, wherein the Web Service Network supports mobile devices, handheld devices, desktop computer devices, user applications, and/or user access control employing multiple domains.

3. The system according to claim 1, wherein the system comprises a Buy on Demand Market network employing multiple domains of the plurality of networked domains.

4. The system according to claim 1, wherein the system comprises a Buy on Demand Market network viably supports business attributes for any tangible asset purchased or resold by a commercial business, employing multiple domains of the plurality of networked domains.

5. The system according to claim 1, wherein the system comprises a Bid to Market network employing multiple domains of the plurality of networked domains.

6. The system according to claim 1, wherein the Web Service Network viably functions within a rent processing services by the bit or rent by use time environment, employing multiple domains of the plurality of networked domains.

7. The system according to claim 1, wherein the Web Service Network administers a near zero cash cycle flooring finance service for liquidation of accounts receivable for a fee.

8. The system according to claim 1, wherein the Web Service Network viably functions within a rent data storage by the bit or rent by use time environment, employing multiple domains.

9. The system according to claim 1, wherein the Web Service Network viably supports software as a service, employing multiple domains.

10. The system according to claim 1, wherein the system comprises a content distribution network employing multiple domains of the plurality of networked domains.

11. The system according to claim 1, wherein the system comprises a Web Service Network implementing network protocols based on the Web Services-Management Standard.

12. The system according to claim 1, wherein the system enables semi or fully autonomic commercial procurement schemes.

13. The system according to claim 1, wherein the system enables semi or fully autonomic business method for the semi or fully autonomic logistics management schemes.

* * * * *